US012561801B2

(12) United States Patent
Rajagopal et al.

(10) Patent No.: US 12,561,801 B2
(45) Date of Patent: Feb. 24, 2026

(54) MACHINE LEARNING TECHNIQUES FOR TUMOR IDENTIFICATION, CLASSIFICATION, AND GRADING

(71) Applicant: The Regents of the University of California, Oakland, CA (US)

(72) Inventors: Abhejit Rajagopal, Oakland, CA (US); Kirti Magudia, Oakland, CA (US); Peder E.Z. Larson, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 206 days.

(21) Appl. No.: 18/251,531

(22) PCT Filed: Nov. 5, 2021

(86) PCT No.: PCT/US2021/072268
§ 371 (c)(1),
(2) Date: May 2, 2023

(87) PCT Pub. No.: WO2022/099303
PCT Pub. Date: May 12, 2022

(65) Prior Publication Data
US 2023/0410301 A1 Dec. 21, 2023

Related U.S. Application Data

(60) Provisional application No. 63/110,741, filed on Nov. 6, 2020.

(51) Int. Cl.
*G06T 7/00* (2017.01)
*G06T 7/11* (2017.01)

(52) U.S. Cl.
CPC .............. *G06T 7/0012* (2013.01); *G06T 7/11* (2017.01); *G06T 2207/10088* (2013.01);
(Continued)

(58) Field of Classification Search
CPC ..................... G06T 7/0012; G06T 7/11; G06T 2207/10088; G06T 2207/20084;
(Continued)

(56) References Cited

U.S. PATENT DOCUMENTS 10,229,499 B2 3/2019 Bozorgtabar et al.
11,551,353 B2 * 1/2023 Golden ..................... G06T 7/11
(Continued)

FOREIGN PATENT DOCUMENTS

CN 110197229 A 9/2019

*Primary Examiner* — Juan M Guillermety
(74) *Attorney, Agent, or Firm* — Kilpatrick Townsend & Stockton LLP

(57) ABSTRACT

The present disclosure relates to techniques for non-invasive tumor identification, classification, and grading using mixed exam-, region-, and voxel-wise supervision. Particularly, aspects are directed to a computer implemented method that includes obtaining medical images of a subject, inputting the medical images into a three-dimensional neural network model constructed to produce a voxelwise cancer risk map of lesion occupancy and cancer grade as two output channels using an objective function having a first loss function that captures strongly supervised loss for regression in lesions and a second loss function that captures weakly supervised loss for regression in regions, generating an estimated segmentation boundary around one or more lesions, predicting a cancer grade for each pixel or voxel within the medical images, and outputting the voxelwise cancer risk map of lesion occupancy determined based on the estimated segmentation boundary and the cancer grade for each pixel or voxel within the medical images.

20 Claims, 12 Drawing Sheets

(52) U.S. Cl.
CPC ............... *G06T 2207/20084* (2013.01); *G06T 2207/30081* (2013.01); *G06T 2207/30096* (2013.01)

(58) Field of Classification Search
CPC . G06T 2207/30081; G06T 2207/30096; G06T 7/12; A61B 5/7264; A61B 5/055; G06N 3/045; G16H 50/20; G16H 30/40
See application file for complete search history.

(56) References Cited

U.S. PATENT DOCUMENTS

| | | | |
|---|---|---|---|
| 2019/0370965 A1* | 12/2019 | Lay ........................ | G06T 7/0012 |
| 2020/0085382 A1 | 3/2020 | Taerum et al. | |
| 2020/0167931 A1 | 5/2020 | Wang et al. | |
| 2020/0327667 A1 | 10/2020 | Arbel et al. | |
| 2022/0138931 A1* | 5/2022 | Palma ........................ | G06T 7/11 |
| | | | 382/128 |
| 2022/0138932 A1* | 5/2022 | Bonakdar Sakhi ... | G06T 7/0012 |
| | | | 382/128 |

* cited by examiner

600

Figure 3: Comparison of cancer grade predictions (slice z=22) for a test exam from networks trained with strong supervision and mixed strong-weak supervision, respectively. In particular, the groundtruth sextant biopsy data only specifies the maximum in each sextant, not the distribution or spatial pattern.

MACHINE LEARNING TECHNIQUES FOR TUMOR IDENTIFICATION, CLASSIFICATION, AND GRADING

PRIORITY CLAIM

This application claims the benefit of and priority to U.S. Provisional Application No. 63/110,741, filed on Nov. 6, 2020, which is hereby incorporated by reference in its entirety for all purposes.

FIELD

The present invention relates to automated tumor identification, classification, and grading, and in particular to machine-learning techniques for non-invasive tumor identification, classification, and grading using mixed exam-, region-, and voxel-wise supervision.

BACKGROUND

Computer vision involves working with digital images and videos to deduce some understanding of contents within the images and videos (i.e., image frame). Object recognition is associated with computer vision and refers to a collection of related computer vision tasks that involve identifying objects present in an image frame. The tasks include image classification, object localization, object detection, and object segmentation. Image classification involves predicting the class of one or more objects in an image frame. Object localization refers to identifying the location of one or more objects in an image frame and drawing abounding box around their extent. Object detection combines these two tasks and localizes and classifies one or more objects in an image frame. Object segmentation involves drawing the boundaries of the objects within an image frame at the pixel level. Object segmentation can assist with object detection tasks in real-world scenarios such as tumor or lesion detection, and differentiate between multiple similar objects in the same image frame.

Object segmentation includes semantic segmentation and instance segmentation. Semantic segmentation classifies object features in the image frame and comprised of sets of pixels into meaningful classes that correspond with real-world categories. Instance segmentation identifies each instance of each object featured in the image instead of categorizing each pixel like in semantic segmentation. For example, instead of classifying multiple lesions as one instance, it will identify each individual lesion. Semantic segmentation is one of the most fundamental challenges in computer vision, and conventional fully supervised algorithms have demonstrated promising results. However, in order to train fully supervised systems, a set of training examples with semantic labels for each pixel in an image frame is required. This can be particularly difficult in medical imaging where semantic labeling is typically sparse due to a number of reasons including low resolution of images, sparse signaling, ambiguous boundaries between objects, and the abundant number of structures to be differentiated. Accordingly, the need exists for a semantic segmentation approach to handle weak supervision especially in the context of medical imaging.

BRIEF SUMMARY

In various embodiments, a computer-implemented method is provided for cancer detection, the method comprising: obtaining medical images of a subject, the medical images include an object of interest; inputting the medical images into a three-dimensional neural network model constructed to produce a voxelwise risk map of an object of interest occupancy and disease state grade as two output channels using an objective function comprising a first loss function and a second loss function, where the first loss function captures supervised loss for regression in the object of interest and the second loss function captures supervised loss for regression in regions of the object of interest; generating, using the three-dimensional neural network model, an estimated segmentation boundary around the object of interest; predicting, using the three-dimensional neural network model, a disease state grade for each pixel or voxel within the medical images; and outputting, using the three-dimensional neural network, the voxelwise risk map of the object of interest occupancy determined based on the estimated segmentation boundary around the object of interest and the disease state grade for each pixel or voxel within the medical images.

In some embodiments, the object of interest is a lesion. Optionally, the medical images are obtained using magnetic resonance imaging.

In some embodiments, the method further comprises, prior to inputting the medical images into a three-dimensional neural network model: inputting the medical images into a segmentation model constructed to segment a region of interest; generating, using the segmentation model, an estimated segmentation boundary around the region of interest; outputting, using the segmentation model, the medical images with the estimated segmentation boundary around the region of interest; and cropping the medical images based on the estimated segmentation boundary to generate portions of the medical images comprising the region of interest, where the portions of the medical images comprising the region of interest are input into the three-dimensional neural network model for producing the voxelwise risk map of the object of interest occupancy and the disease state grade as the two output channels.

In some embodiments, the region of interest is the prostate gland.

In some embodiments: the three-dimensional neural network model comprises a plurality of model parameters identified using a set of training data comprising a plurality of medical images with annotations associated with: (i) segmentation boundaries around objects of interest and systematic or region biopsy with disease state grades; and the plurality of model parameters are identified using the set of training data based on minimizing the objective function.

In some embodiments, the objective function further comprises a Dice loss function, and the objective function averages the supervised loss for regression in the object of interest and the supervised loss for regression in the regions of the object of interest over each region and observed grade group.

In some embodiments, the three-dimensional neural network model is a 3D U-Net model.

In some embodiments, the method further comprises: determining a size, surface area, and/or volume of the one or more lesions based on the estimated segmentation boundary; and providing: (i) the voxelwise cancer risk map, and/or (ii) a size, surface area, and/or volume of the object of interest.

In some embodiments, the method further comprises: determining, by a user, a diagnosis of the subject based on (i) the voxelwise cancer risk map, and/or (ii) the size, surface area, and/or volume of the object of interest.

In some embodiments, the method further comprises administering, by the user, a treatment with a compound based on (i) the voxelwise cancer risk map, (ii) the size, surface area, and/or volume of the object of interest, and/or (iii) the diagnosis of the subject.

In various embodiments, a computer-implemented method is provided for cancer detection, the method comprising: obtaining medical images of a subject, the medical images include an object of interest; inputting the medical images into a three-dimensional neural network model constructed to produce a voxelwise risk map of an object of interest occupancy and disease state grade as two output channels using an objective function comprising an object loss function and one or more histogram-based loss functions, where the object loss function captures supervised loss for regression in the object of interest and the histogram-based second loss function captures supervised loss for regression in regions of the object of interest, and wherein each loss function of the one or more histogram-based loss functions provides a differentiable measure of accuracy in predicting object of interest occupancy, disease state grade, or properties thereof in each voxel, region, and/or exam; generating, using the three-dimensional neural network model, an estimated segmentation boundary around the object of interest; predicting, using the three-dimensional neural network model, a disease state grade for each pixel or voxel within the medical images; and outputting, using the three-dimensional neural network, the voxelwise risk map of the object of interest occupancy determined based on the estimated segmentation boundary around the object of interest and the disease state grade for each pixel or voxel within the medical images.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims

BRIEF DESCRIPTION OF THE DRAWINGS

The present invention will be better understood in view of the following non-limiting figures, in which.

DETAILED DESCRIPTION

I. Introduction

Figure 1:
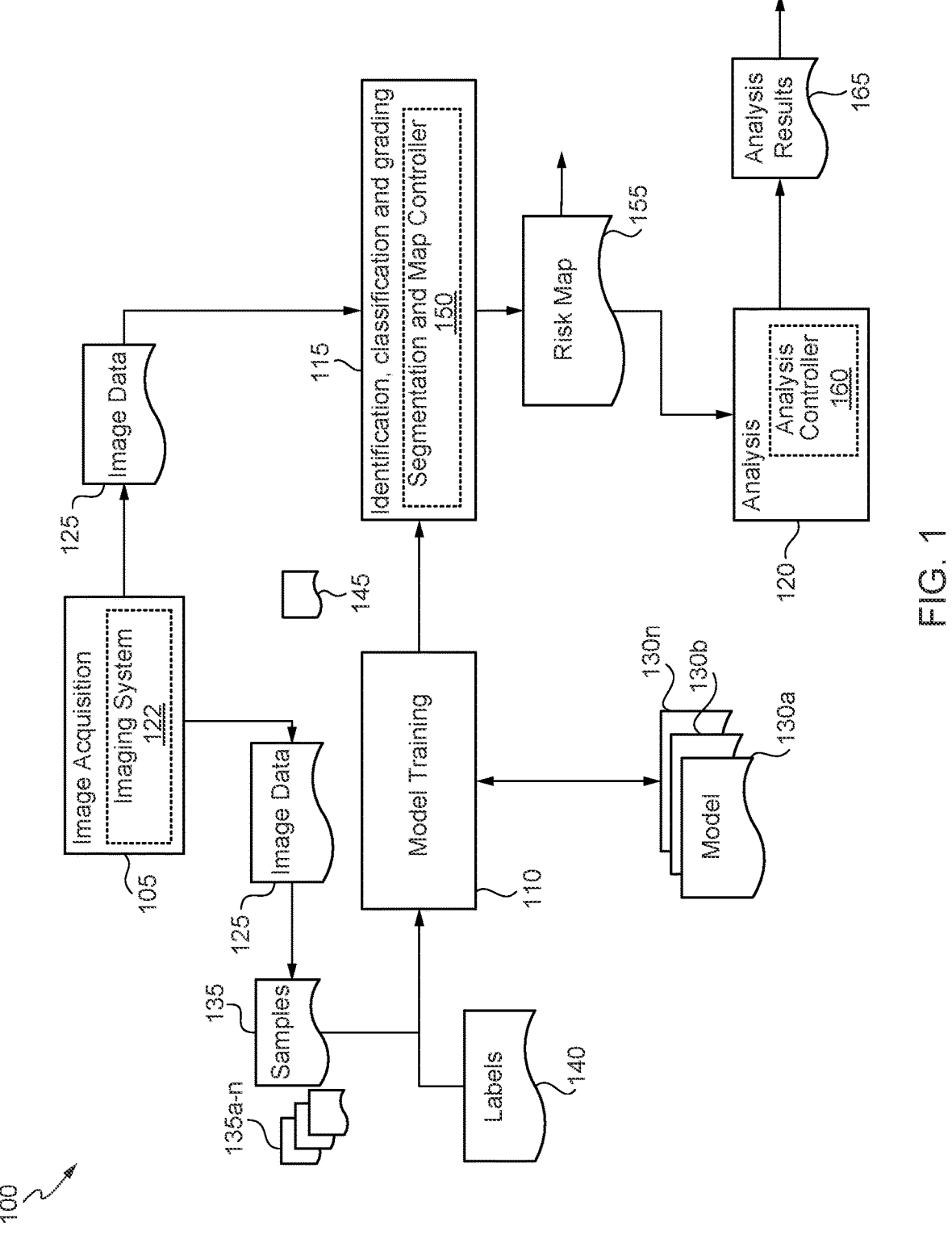
FIG. 1 shows an example computing environment for non-invasive tumor identification, classification, and grading using mixed exam-, region-, and voxel-wise supervision according to various embodiments.

Cancer detection is a challenging problem, which has been the focus of numerous machine-learning challenges and papers. For specific types of cancer such as prostate cancer, various medical imaging modalities such as magnetic resonance imaging (MRI) are routinely used for subjects to detect and localize lesions that are "likely" cancer, enabling MR/ultrasound fusion guided invasive biopsy. With respect to prostate cancer, the biopsy tissue samples may be processed and histology evaluated based on sub-millimeter optical features, including lack of normal glandular structure and tumor cell infiltration of the stroma, to determine Gleason score and grade, which are the dominant predictors of subject outcome. Thus, many subjects undergo prostate biopsy as part of screening for suspected prostate cancer or for monitoring of known prostate cancer; in fact, those with low grade disease (Gleason grade 1) on active surveillance undergo biopsy repeatedly. To prevent unnecessary biopsy and the risks of an invasive procedure, it is of great interest to enable the early and accurate detection of clinically-significant prostate cancer (CS-PCa) directly from MRI, which typically has anisotropic resolution from 1-4 mm in this scenario.

From a clinical standpoint, MRI provides fast, safe (radiation-free), and reliable information on the location of lesions due to its excellent soft-tissue contrast compared to digital rectal exam, prostate specific antigen (PSA) laboratory testing, or even ultrasound. Yet, MRI is still a weak predictor of CS-PCa for radiologists, yielding a positive predictive value of 37% and an average detection accuracy of 65% using the (human-supervised) Prostate Imaging Reporting & Data System (PIRADS) clinical standard in a recent cross-center study. Numerous recent works have sought to increase this accuracy using deep learning, but have ultimately only made marginal (if any) improvements to the sensitivity and specificity of human scoring using PIRADS. A predominant factor of this apparent failure is the lack of strong groundtruth data; while radiologist-derived PIRADS provides easily-attainable target values, whole-mount prostatectomy-derived 3D histopathology is the clinically-recognized gold standard, albeit one that is further removed from the original imaging modality (e.g., MRI) and only available from subjects with cancer severe enough to warrant prostatectomy.

An alternative here is to instead regress on biopsy results, which occur after an initial MRI screening but prior to any gland or tumor resection, providing a balanced and clinically-relevant middle-ground. Although the exact protocol can vary by institution, prostate biopsies are typically guided by ultrasound and involve sampling tissue from lesions identified on MRI after the previously acquired MRI is fused with live ultrasound (ultrasound/MRI fusion biopsy aka targeted lesion biopsy), as well as systematic sampling of points around the prostate (e.g. at loosely-defined sextants). While the lesion samples can be approximated with their 3D position in the original MRI, the systematic sextant sampling positions are not retained. As a result, prostate biopsy reports contain histology information on sites with only coarse regional coordinates (sextant location: left apex, left mid, left base, right apex, right mid, right base). Experimental data discussed in detail herein, has demonstrated that 14% of subjects with CS-PCa had CS-PCa detected by systematic biopsy alone after evaluation prostate MRI and not by targeted biopsy. Furthermore, in 12% of cases the sextant biopsy score was higher than the lesion biopsy score in the same sextant, indicating detecting CS-PCa that would have been missed without systematic biopsy. Thus, the option of regressing only on localized lesion-biopsy scores is fundamentally limited. On the other hand, incorporation of sextant data is not straightforward, since it is unknown precisely which coordinates of the prostate were sampled, and whether the sampled point is indicative of cancer in the entire sextant.

To address these problems and others, the present disclosure introduces techniques for incorporating multiple sources of pathology data under a single umbrella to improve a machine-learning based cancer classification system over what was possible using any individual pathology source. Specifically, these techniques provide operability to jointly utilize multiple sources of groundtruth pathology (e.g., lesion biopsies, systematic biopsies, and whole-mount histopathology) to improve a non-invasive cancer identification, classification, and grading system. Moreover, these techniques provide operability to (i) supervise the training or optimization of such inference systems by incorporating groundtruth values, by range, and/or by distribution; (ii) derive a 3D representation of cancer, at both tumor sites and non-obvious abnormal tissue not previously identified by standard interpretation of prostate MRI by a radiologist, corresponding with the pathological definition of cancer;

and (iii) generate characteristic signatures for different cancer grades without hand-crafted features or feature representations at both tumor sites and nontumor sites.

One illustrative embodiment of the present disclosure is directed to a technique for enhancing cancer grading voxel-wise using as groundtruth a combination of strong lesion-biopsy scores and weak region-biopsy scores (e.g., weak sextant-biopsy scores). This is achieved by integrating routinely collected clinical data into the training routine to increase the granularity of predictions and overall performance of clinically-significant cancer (e.g., CS-PCa) detection. In various instances, the techniques described herein utilize biopsy-derived histopathology groundtruth sampled at MR-identified lesions with known coordinates, together with data sampled from systematic biopsy sites throughout a region (e.g., an organ such as the prostrate) with coarse regional coordinates, to supervise the prediction of clinically-significant cancer (e.g., CS-PCa) in a 3D space. In certain instances, the optimization problem is formulated to enable simultaneous use of both these data sources despite their disparate granularity. Results discussed in detail herein positively indicate improved performance in prostate cancer detection and grading compared with methodologies only focused on lesions. It should however be appreciated that although the description herein illustrates techniques for enhancing cancer grading voxel-wise in the context of MRI and prostate cancer, the techniques can be implemented with respect to other types of imaging modalities and applications. For example, the techniques could be expanded beyond cancer applications to any application where imaging is used and multiple sources of groundtruth are available.

Advantageously, these techniques are not only able to detect cancer from multiparametric MRI accurately across all grading groups (e.g., Gleason grade groups), but they are also able to improve the detection of clinically-significant cancer in subjects exhibiting significant cancer outside lesions visible on MRI. This improved capability has the potential to refine procedures for subject selection, biopsy, surgery, and even treatment. Moreover, these techniques allow for using larger datasets (e.g., imaging with any type of associated pathology results) and more information (e.g., multiple sources of pathology data) in the development of machine-learning models, which will ultimately improve model performance.

II. Computing Environment for Strong-Weak Supervision for Improved Inference

FIG. 1 illustrates an example computing environment 100 (i.e., a data processing system) for tumor identification, classification, and grading using deep neural networks according to various embodiments. As shown in FIG. 1, the tumor identification, classification, and grading performed by the computing environment 100 in this example includes several stages: an image acquisition stage 105, a model training stage 110, an identification, classification, and grading stage 115, and an analysis stage 120.

The image acquisition stage 105 includes one or more imaging systems 122 (e.g., an MRU imaging system) for obtaining images 125 (e.g., MR images) of various parts of a subject. The imaging systems 122 are configured to use one or more radiological imaging techniques such as x-ray radiography, fluoroscopy, MRI, ultrasound, nuclear medicine functional imaging (e.g., PET), thermography, CT, mammography and the like to obtain the images 125. The imaging systems 122 are able to determine the difference between various structures and functions within the subject based on characteristics (e.g., brightness, contrast, and spatial resolution) associated with each of the imaging systems 122 and generate a series of two-dimensional images. In some instances, once the series of two-dimensional images are collected by the scanner's computer, the two-dimensional images can be digitally "stacked" together by computer analysis to reconstruct a three-dimensional image of the subject or a portion of the subject. The two-dimensional images and/or the reconstructed three-dimensional images 125 allow for easier identification and location of basic structures (e.g., organs) as well as possible tumors or abnormalities. Each two-dimensional image and/or the reconstructed three-dimensional image 125 may correspond to a session time and a subject and depict an interior region of the subject. Each two-dimensional image and/or the reconstructed three-dimensional image 125 may further be of a standardized size, resolution, and/or magnification.

The images 125 depict one or more objects of interest. The objects of interest can be any 'thing' of interest within the subject such as a region (e.g., an abdominal region), an organ (e.g., the prostate), a lesion/tumor (e.g., a non-invasive prostate tumor), a metabolic function (e.g., uptake of biomarker), a specific disease state (e.g., cancer such as CS-PCa), and the like. In some instances, multiple images 125 depict an object of interest, such that each of the multiple images 125 may correspond to a virtual "slice" of the object of interest. Each of the multiple images 125 may have a same viewing angle, such that each image 125 depicts a plane that it parallel to other planes depicted in other images 125 corresponding to the subject and object of interest. Each of the multiple images 125 may further correspond to a different distance along a perpendicular axis to the plane. In some instances, the multiple images 125 depicting the object of interest undergo a pre-processing step to align each image and generate a two-dimensional or three-dimensional image structure for the object of interest.

The model training stage 110 builds and trains one or more models 130a-130n ('n' represents any natural number) (which may be referred to herein individually as a model 130 or collectively as the models 130) to be used by the other stages. The model 130 can be a machine-learning ("ML") model, such as a convolutional neural network ("CNN"), e.g. an inception neural network, a residual neural network ("Resnet"), a U-Net, a V-Net, a single shot multibox detector ("SSD") network, or a recurrent neural network ("RNN"), e.g., long short-term memory ("LSTM") models or gated recurrent units ("GRUs") models, or any combination thereof. The model 130 can also be any other suitable ML model trained in object detection and/or segmentation from images, such as a three-dimensional CNN ("3DCNN"), a dynamic time warping ("DTW") technique, a hidden Markov model ("HMM"), etc., or combinations of one or more of such techniques—e.g., CNN-HMM or MCNN (Multi-Scale Convolutional Neural Network). The computing environment 100 may employ the same type of model or different types of models for segmenting instances of an object of interest. In certain instances, model 130 is constructed with a multi-task objective function (e.g., a combination of two or more loss functions), which allows for incorporating both strong and weak tumor labels in a 3D space.

To train a model 130 in this example, samples 135 are generated by acquiring digital images, splitting the images into a subset of images 135a for training (e.g., 90%) and a subset of images 135b for validation (e.g., 10%), preprocessing and/or augmenting the subset of images 135a (and optionally the subset of images 135b) and annotating the subset of images 135a with labels 140. The subset of images 135a are acquired from one or more imaging modalities (e.g., MRI and CT). In some instances, the subset of images 135a are acquired from a data storage structure such as a database, an image system (e.g., one or more imaging systems 122), or the like associated with the one or more imaging modalities. Each image depicts one or more objects of interest such as a cephalic region, a chest region, an abdominal region, a pelvic region, a spleen, a liver, a kidney, a brain, a prostate gland, a tumor, a lesion, or the like.

The splitting may be performed randomly (e.g., a 90/10% or 70/30%) or the splitting may be performed in accordance with a more complex validation technique such as K-Fold Cross-Validation, Leave-one-out Cross-Validation, Leave-one-group-out Cross-Validation, Nested Cross-Validation, or the like to minimize sampling bias and overfitting. The preprocessing may comprise cropping the images such that each image only contains a single object of interest. In some instances, the preprocessing may further comprise standardization or normalization to put all features on a same scale (e.g., a same size scale or a same color scale or color saturation scale). In certain instances, the images are resized with a minimum size (width or height) of predetermined pixels or voxels (e.g., 2500 pixels) or with a maximum size (width or height) of predetermined pixels or voxels (e.g., 3000 pixels) and kept with the original aspect ratio.

Augmentation can be used to artificially expand the size of the subset of images 135a by creating modified versions of images in the datasets. Image data augmentation may be performed by creating transformed versions of images in the datasets that belong to the same class as the original image. Transforms include a range of operations from the field of image manipulation, such as shifts, flips, zooms, and the like. In some instances, the operations include random erasing, shifting, brightness, rotation, Gaussian blurring, and/or elastic transformation to ensure that the model 130 is able to perform under circumstances outside those available from the subset of images 135a.

Figure 2:
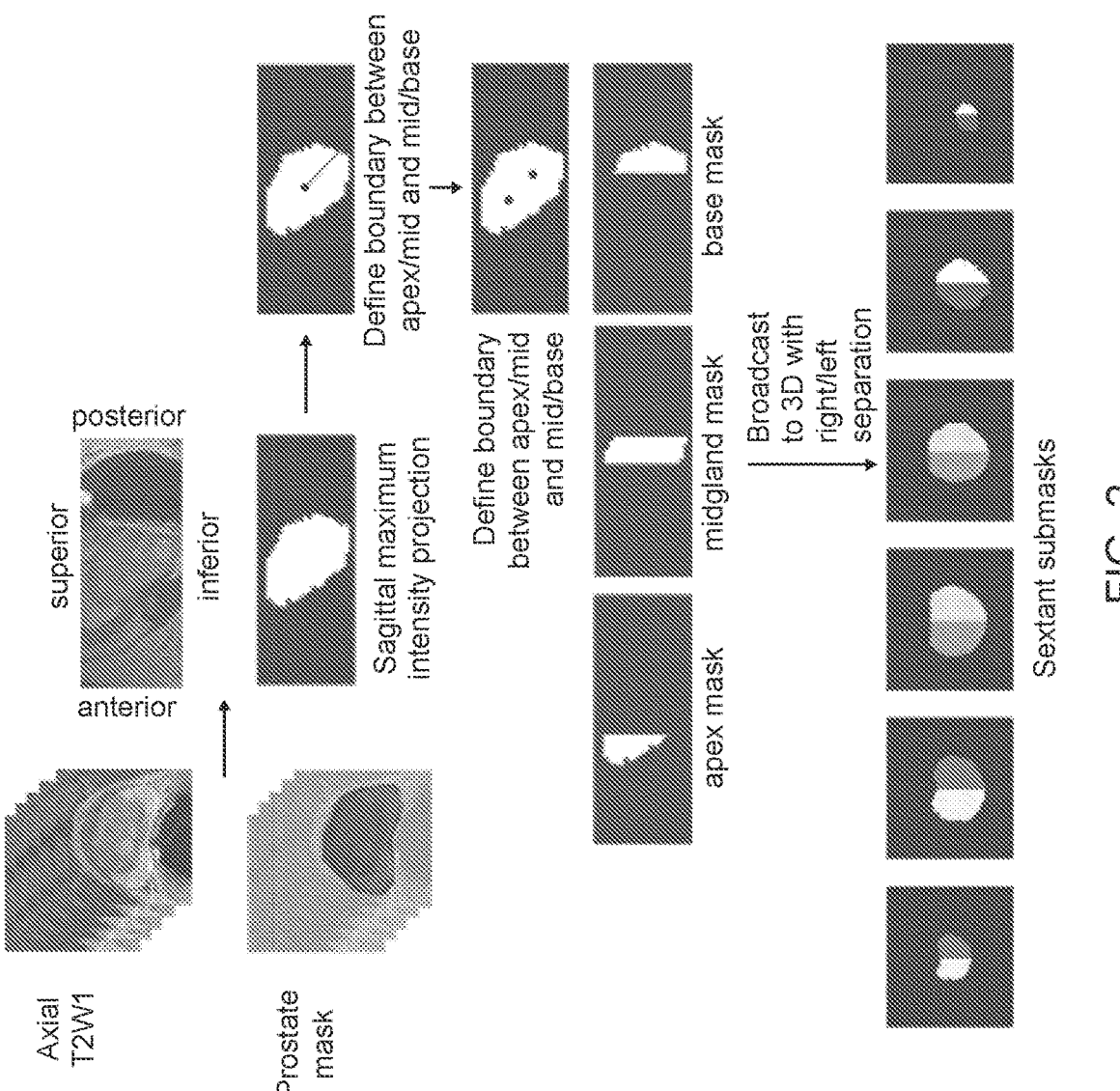
FIG. 2 shows geometric processing whereby a prostate is split automatically into sextants in accordance with various embodiments.

Preprocessing can be used to localize a region or object of interest within the images 135a. In some instances, a subset of images 135a (e.g., T2 weighted images (T2WI)) are input into a model 130 trained for segmenting a region of a subject, e.g., an organ such as the prostate gland. Segmentation masks from the trained model may be manually reviewed and if necessary, manually corrected, by one or more human annotators. As shown in FIG. 2, dilation, smoothing, and thresholding may be performed using the whole organ or gland segmentations to obtain binary masks for focusing the attention of the network on the whole organ or gland (during training) and to obtain 3D coordinates for multiple regions (e.g., sextants with respect to the prostate gland) of the whole organ or gland. A sagittal maximum intensity projection of the whole organ or gland may be isotropically resampled and fit with a predefined shape such as an ellipse. The major axis of the predefined shape may be divided equally to determine the boundaries between the apex, mid and base of the organ or gland. Any additional differentiating boundaries of the organ or gland may be determined based on the boundaries between the apex, mid and base of the organ or gland. These boundaries may then be broadcast into 3D and resampled to the original image resolution. All region segmentations may be manually reviewed by one or more human annotators. In certain instances, apparent diffusion coefficient (ADC) and diffusion weighted imaging (DWI) are registered to T2WI using subject coordinates and an Advanced Normalization Tools registration module. The registration may be manually reviewed by one or more human annotators. T2WI, ADC and DWI pixel values may be normalized separately for each exam and series by rescaling pixel intensities within the segmented organ or gland from 0.5% to 99.5%. All or a portion of the images may be resampled to a minimum pixel spacing in the X, Y and Z direction present within the images 135a.

Annotation can be performed manually by one or more humans (annotators such as a radiologists or pathologists) confirming the presence of one or more objects of interest in each image of the subset of images 135a and providing labels 140 to the one or more objects of interest, for example, drawing a bounding box (a groundtruth) or segmentation boundary, using annotation software, around the area confirmed by the human to include the one or more objects of interest. The primary objective of the labeling and training of a model 130 is to improve the detection of the objects of interest such as CS-PCa from imaging modalities such as MRI with at least two groundtruths (e.g., location and grading information) compared to the clinical standard of a single groundtruth such as PIRADS. Initially, the labeling and training uses lesion locations provided as volumetric masks and multi-level lesion Gleason grade values (e.g., multi-classification) to strongly supervise a model 130. These results may be evaluated on a lesion-wise and region-wise basis. Additionally, the labeling and training uses region locations in the form of volumetric masks and multi-level region Gleason grade values (e.g., multi-classification) to add weak supervision to the model 130. Both strong and weakly supervised inputs improve the detection and segmentation of objects on a region-wise basis.

The annotation process may include transmitting a subset of images 135a to an annotator device to be included within a training data set (i.e., the subset of images 135a). Input may be provided (e.g., by a radiologist) to the annotator device 135 using (for example) a mouse, track pad, stylus and/or keyboard that indicates (for example) whether the image depicts an object of interest (e.g., a lesion, an organ, etc.); a number of objects of interest depicted within the image; and a perimeter (bounding box or segmentation boundary) of each depicted object of interest within the image. Annotator device may be configured to use the provided input to generate labels 140 for each image. For example, the labels 140 may include a number of objects of interest depicted within an image; a type classification for each depicted objects of interest; a number of each depicted object of interest of a particular type; and a perimeter and/or mask of one or more identified objects of interest within an image. In some instances, labels 140 may further include a perimeter and/or mask of one or more identified objects of interest overlaid onto a first type of image and a second type of image (e.g., ADC, DWI, dynamic contrast enhancement (DCE), and the like).

In some embodiments, the annotation process further includes extracting data from medical data ancillary to the images such as pathology and radiology reports in order to confirm and/or supplement labels 140. For example, biopsy pathology reports may be split into individual results. Any result containing the imaging modality such as "MRI" may be identified and a Gleason score extracted by isolating numbers preceding and following a character, which may then be converted to a Gleason grade (a groundtruth). Similarly, any result starting with text corresponding to a systematic/region biopsy site (left/right apex/mid/base/anterior) may be identified and a Gleason score may be extracted, which may then be converted to Gleason grade (a groundtruth). Mid and anterior grade results may be combined with maximum grade. The labeling 140 of MR lesions may be confirmed to match between pathology reports and radiology reports by manual or annotator review.

Figure 3:
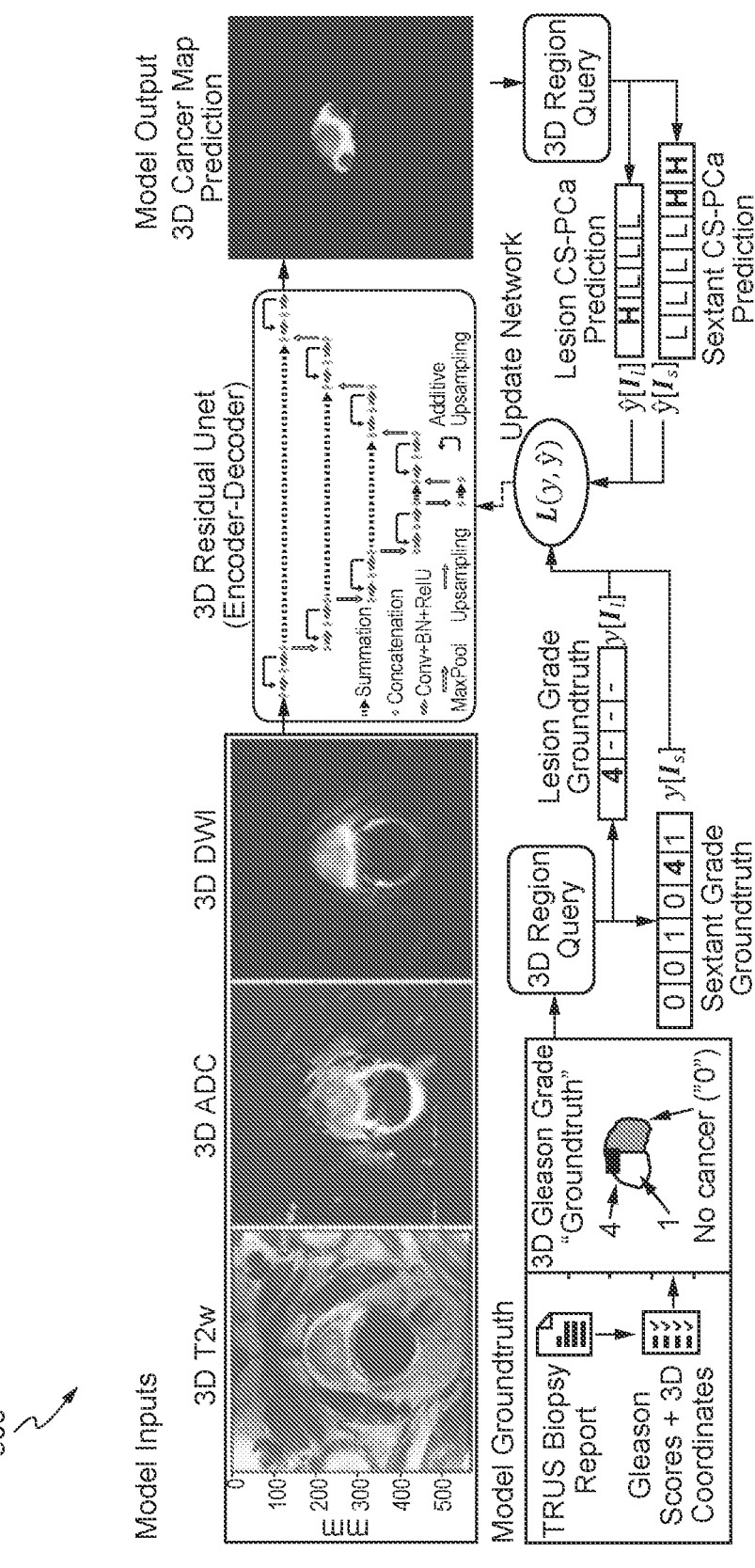
FIG. 3 shows an overview of the method using a three-dimensional (3D) neural network model with strong/weak labels. Input 3D mpMRI is used to produce a 3D cancer grade map, queried where there is groundtruth in accordance with various embodiments.

FIG. 3 shows an overview of a training process for a model 130. The training process includes selecting hyperparameters for the model 130 and performing iterative operations of inputting images from the subset of images 135a into the model 130 to find a set of model parameters (e.g., weights and/or biases) that minimizes the objective function for the model 130. The hyperparameters are settings that can be tuned or optimized to control the behavior of the model 130. Most models explicitly define hyperparameters that control different aspects of the models such as memory or cost of execution. However, additional hyperparameters may be defined to adapt a model to a specific scenario. For example, the hyperparameters may include the number of hidden units of a model, the learning rate of a model, weighting between loss terms, the convolution kernel width, the number of kernels for a model, learning rate, batch size, subvolume size, subvolume selection criteria, and batch composition.

Each iteration of training can involve finding a set of model parameters for the model 130 (configured with a defined set of hyperparameters) so that the value of the objective function using the set of model parameters is smaller than the value of the objective function using a different set of model parameters in a previous iteration. The objective function can be constructed to measure the difference between the outputs inferred using the models 130 and the groundtruths annotated to the images using the labels 140. In some instances, the objective function is a combination of two for more loss functions for regression of the two or more ground truths. In certain instances, the objective function (Equation 4 described in detail with respect to Section IV) is constructed combining the strongly supervised loss for regression in lesions that compares cancer detections at each voxel (Equation 1 described in detail with respect to Section IV), with weakly supervised loss for regression in regions that approximates and penalizes the max peak of a region (Equation 3 described in detail with respect to Section IV), averaging these losses over each region and observed grade group, and adding an additional semantic segmentation (DICE) loss. In certain instances, additional objective functions may be added even if they do not provide direct strong or weak supervision to the lesion occupancy detection or cancer grading in voxels or regions, but instead provide indirect supervision to other desirable properties of these 3D maps (e.g. smooth spatial distribution, or sharp histogram distribution) that may improve the overall interpretation of the maps or derivative classifications.

The model 130 is constructed to take as input the subset of images 135a (e.g., a registered three channel 3D MRI input using T2w, DWI, ADC) and for each pixel or voxel the model 130 predicts a cancer grade (e.g., 0-5) to produce voxel-wise maps of lesion occupancy (semantic segmentation) and cancer grade as two output channels (i.e., a 3D cancer grade map) with a same resolution as the subset of images 135a. Thus, the encoded feature representation generated from the model 130 is used for related but distinct tasks of segmenting lesions and predicting cancer grade throughout the localized region or object of interest within the images 135a, whether binary or multi-level.

Figure 4:
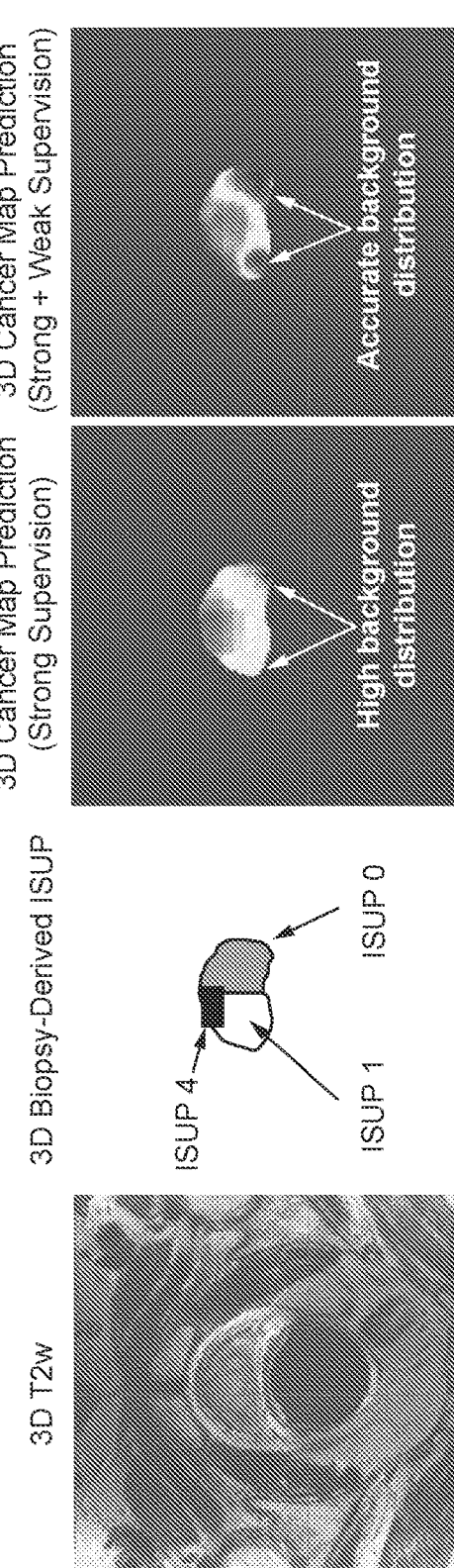
FIG. 4 shows a comparison of cancer grade predictions (slice z=22) for a test exam from networks trained with strong supervision and mixed strong-weak supervision, respectively, in accordance with various embodiments. In particular, the groundtruth sextant biopsy data only specifies the maximum in each sextant, not the distribution or spatial pattern.
Figure 5:
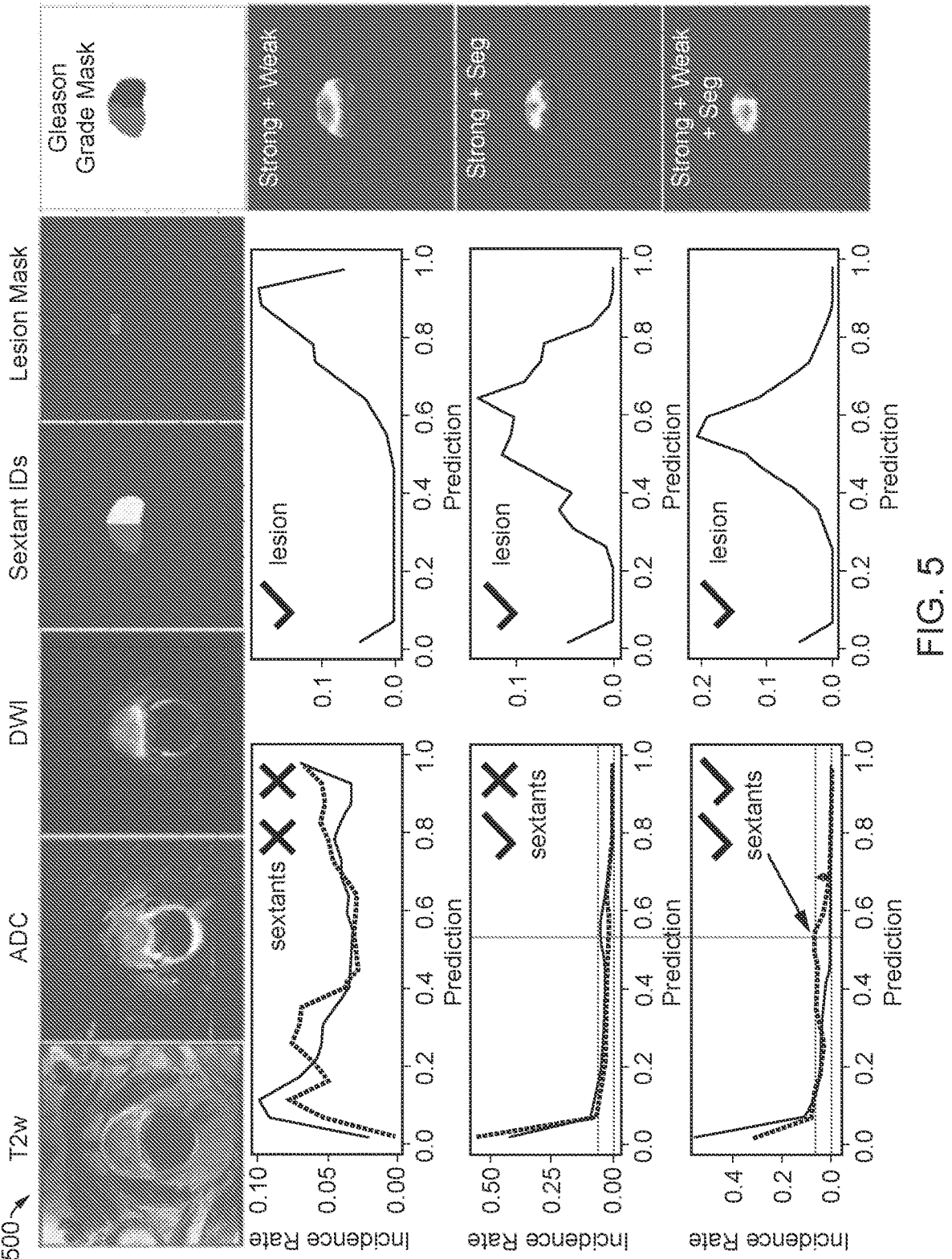
FIG. 5 shows a comparison of predicted histograms for sextant and lesion volumes in accordance with various embodiments.

While cancer grade prediction can be posed as a semantic segmentation task similar to lesion detection/segmentation, the training process of model 130 instead poses cancer grade prediction as a regression task due to the unique problem considered in this disclosure of incorporating both strong and weak cancer labels in the subset of images 135a. The lesion and region voxel coordinates are labeled, and thus the only question is whether a given voxel, region, or organ/gland exhibits clinically-significant cancer. Lesions are expected to be homogeneous, and can therefore be detected by simple (optimal) thresholding and averaging. Regions (e.g., sextants), on the other hand, are highly inhomogeneous, so summarization via a simple mean can prove ineffective, e.g., bimodal distributions. These detection mechanisms are addressed jointly by computing histograms or differentiable approximations thereof of each query region. FIG. 4 shows example histograms from different predicted sextant and lesion query regions. In this representation, cancers in lesions are detected by computing and rounding the average (soft maximum) voxelwise prediction using estimated histogram densities. In contrast to lesion detection, cancers in regions are detected by peak-finding and thresholding histograms by peak prominence and count. The optimal thresholds for both these tasks may be found by sweeping a range of cutoffs one or more training or validation examinations. Alternatively, a differentiable approximation of the histogram of disease state grade (instead of just the soft maximum) may be used directly in the training objective and classification function. In certain cases, the histogram or differentiable approximations thereof, can be directly classified into one or more grades using another classification algorithm (e.g. fully-connected dense network, HMM, or support-vector machine (SVM)). FIG. 5 shows an example where the combination of strong, weak, and segmentation supervision raises the confidence in the accurate prediction of cancer level in the visible sextants ($I_s$, $I_l$).

Once the set of model parameters are identified, the model 130 has been trained and can be validated using the subset of images 135b (testing or validation data set). The validation process includes iterative operations of inputting images from the subset of images 135b into the model 130 using a validation technique such as K-Fold Cross-Validation, Leave-one-out Cross-Validation, Leave-one-group-out Cross-Validation, Nested Cross-Validation, or the like to tune the hyperparameters and ultimately find the optimal set of hyperparameters. Once the optimal set of hyperparameters are obtained, a reserved test set of images from the subset of images 135b are input into the model 135 to obtain output (in this example, the segmentation boundary around one or more objects of interest), and the output is evaluated versus ground truth segmentation boundaries using correlation techniques such as Bland-Altman method and the Spearman's rank correlation coefficients and calculating performance metrics such as the error, accuracy, precision, recall, receiver operating characteristic curve (ROC), etc.

As should be understood, other training/validation mechanisms are contemplated and may be implemented within the computing environment 100. For example, the model 130 may be trained and hyperparameters may be tuned on images from the subset of images 135a and the images from the subset of images 135b may only be used for testing and evaluating performance of the model. Moreover, although the training mechanisms described herein focus on training anew model 130. These training mechanisms can also be utilized to fine tune existing models 130 trained from other datasets. For example, in some instances, a model 130 might have been pre-trained using images of other objects or biological structures or from sections from other subjects or studies (e.g., human trials or murine experiments). In those cases, the models 130 can be used for transfer learning and retrained/validated using the images 135.

The model training stage 110 outputs trained models including one or more trained segmentation and map models 145. In some instance, images 125 are obtained by a segmentation and map controller 150 within the identification, classification, and grading stage 115. The images 125 depict an object of interest. In certain instances, the images are MRI images (e.g., ADC and DWI registered to T2WI) of a sub-volume of a full volume scan of a subject. Optionally, the segmentation and map controller 150 includes processes for preprocess segmenting, using a segmentation model 145, the object of interest (e.g., the prostate gland) within the image(s) 125. The segmenting includes: (i) generating, using the segmentation model 145, an estimated segmentation boundary around a region or object of interest; and (ii) outputting, using the segmentation model 145, images 125 with the estimated segmentation boundary around the region or object of interest. The images with the estimated segmentation boundary around the region or object of interest may then be cropped to localize the region or object of interest.

The segmentation and map controller 150 further includes processes for taking as input images 125 or optionally the cropped portions of images 125 and for each pixel or voxel the segmentation and map model 145 predicts a cancer grade (e.g., 0-5) to produce voxelwise maps of lesion occupancy (semantic segmentation) and cancer grade as two output channels (i.e., a 3D cancer grade map). The processing includes: (i) generating, using a segmentation and map model 145, an estimated segmentation boundary around a region or object of interest, (ii) predicting, using the segmentation and map model 145, a cancer grade for each pixel or voxel (with non-lesion pixels or voxels allowed to take values >0), and (iii) outputting, using the segmentation and map model 145, a voxelwise cancer risk map 155 of lesion occupancy and cancer grade.

The risk map 155 may be transmitted to an analysis controller 160 within the analysis stage 120. The analysis controller 160 includes processes for obtaining or receiving the risk map 155 and determining analysis results 165 based on the lesion occupancy and cancer grade. The analysis controller 160 may further includes processes for determining a size, axial dimensions, a surface area, and/or a volume of the lesion occupancy based on the estimated segmentation boundary around the lesion occupancy. In some instances, the lesion occupancy and cancer grade or derivations thereof (e.g., size, axial dimensions, volume of the object of interest, etc.) is further used to determine a diagnosis and/or a prognosis for a subject. In further instances, the lesion occupancy and cancer grade are compared to the lesion occupancy and cancer grade for the same subject imaged at a previous time point in order to determine a treatment efficacy for the subject. For example, the lesion occupancy and cancer grade may be used to derive information regarding a type of cancer (e.g., a location of lesion), a metastasis progression (e.g., if a number of lesions increase and/or if a number of locations of lesion(s) increase for the subject), and a drug efficacy (e.g., whether a number, size, and/or volume of lesion(s) increase or decrease). In further instances, histograms or differentiable approximations thereof derived from the lesion occupancy and cancer grade can be used to obtain the lesion occupancy and cancer grade for specific regions of interest of the object of interest (e.g., zoom in and get classification for specific region drawn on MRI of the prostate gland).

While not explicitly shown, it will be appreciated that the computing environment 100 may further include a developer device associated with a developer. Communications from a developer device to components of the computing environment 100 may indicate what types of input images are to be used for the models, a number and type of models to be used, hyperparameters of each model, for example, learning rate and number of hidden layers, how data requests are to be formatted, which training data is to be used (e.g., and how to gain access to the training data) and which validation technique is to be used, and/or how the controller processes are to be configured.

III. Techniques for Strong-Weak Supervision for Improved Inference

Figure 6:
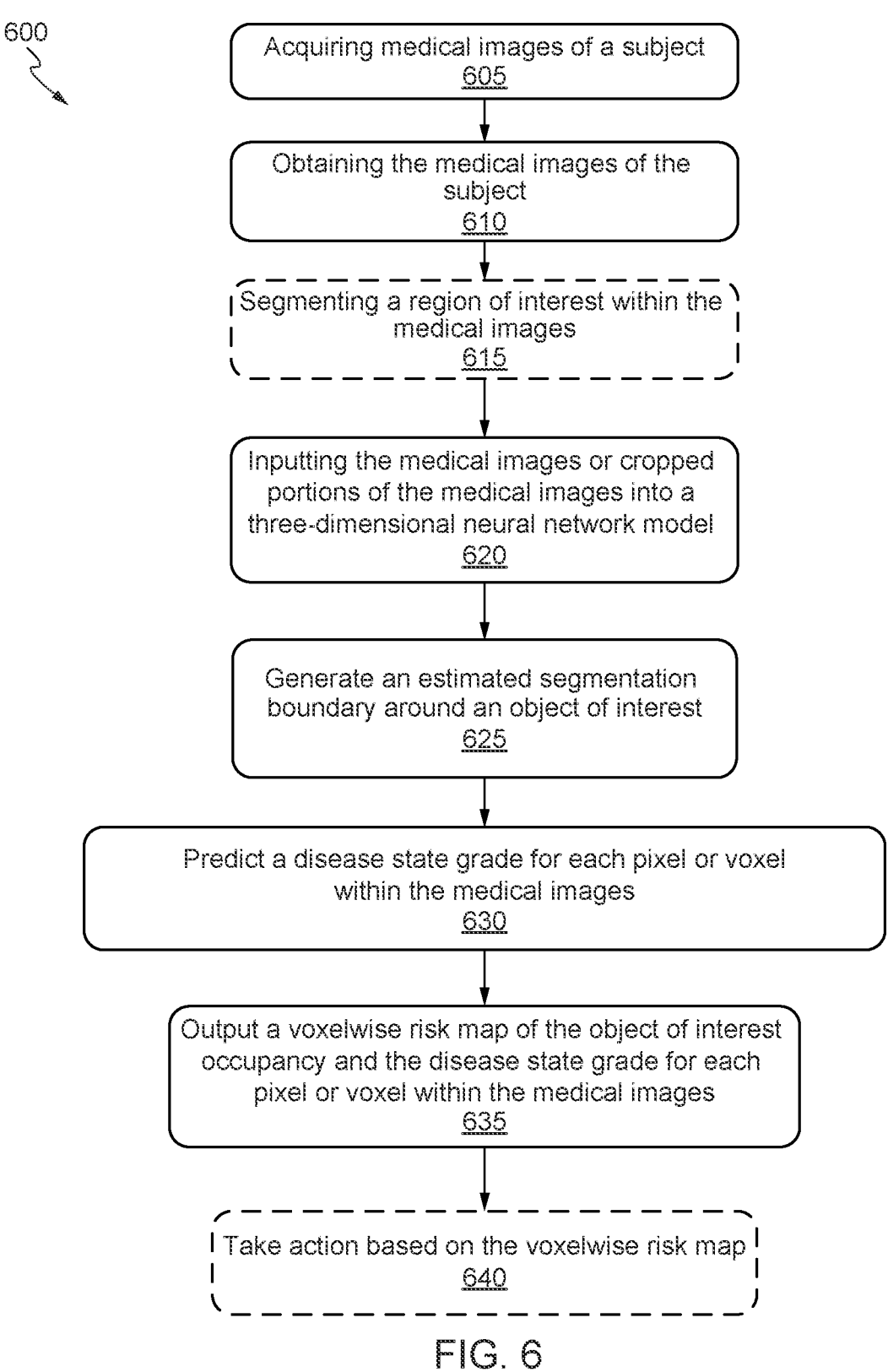
FIG. 6 shows a process for non-invasive tumor identification, classification, and grading using mixed exam-, region-, and voxel-wise supervision according to various embodiments.

FIG. 6 illustrates a flowchart for an exemplary process 600 for using the described segmentation and map models for cancer detection and grading. Process 600 may be performed using one or more computing systems, models, and networks, as described in Section II with respect to FIGS. 1-5.

Process 600 begins at block 600 where medical images are acquired of a subject. The medical images may depict a cephalic region, a chest region, an abdominal region, a pelvic region, and/or a region corresponding to a limb of the subject. The medical images are generated using one or more medical imaging modalities. For example, a user may operate one or more imaging systems that use the one or more medical imaging modalities to generate the medical images, as discussed in Section II with respect to FIG. 1.

At block 610, medical images of the subject are obtained. For example, the medical images acquired in block 605 may be retrieved from a data storage device or the one or more medical imaging systems. The medical images may comprise one or more object of interest (e.g., lesions) with a region of interest (e.g., the prostate). At optional block 615, the medical images are input into a segmentation model constructed to segment the region of interest. The segmentation includes generating an estimated segmentation boundary around the region of interest, and outputting the medical images with the estimated segmentation boundary around the region of interest. In some instances, the output medical images are then cropped based on the estimated segmentation boundary to generate portions of the medical images comprising the region of interest.

At block 620, the medical images or optionally the portions of the medical images comprising the region of interest are input into a three-dimensional neural network model for producing the voxel-wise risk map (e.g., a three dimensional cancer risk map) of an object of interest occupancy (e.g., lesion occupancy) and disease state grade (e.g., cancer grade) as the two output channels using an objective function comprising a first loss function and a second loss function. The first loss function captures supervised loss for regression in the one or more objects of interest and the second loss function captures supervised loss for regression in regions of the one or more objects of the interest. The three-dimensional neural network model comprises a plurality of model parameters identified using a set of training data comprising a plurality of medical images with annotations associated with: (i) segmentation boundaries around object of interest and systematic or region biopsy with disease state grades. The plurality of model parameters are identified using the set of training data based on minimizing the objective function. In some instances, the objective function further comprises a Dice loss function, and the objective function averages the supervised loss for regression in the one or more objects of interest and the supervised loss for regression in the regions of the one or more objects of interest over each region and observed grade group. In certain instances, additional objective functions may be added to provide indirect supervision to other desirable properties of the 3D maps (e.g. smooth spatial distribution, or sharp histogram distribution) that may improve the overall interpretation of the maps or derivative classifications. In certain instances, the three-dimensional neural network model is a 3D U-Net model.

At block 625, an estimated segmentation boundary is generated around the one or more objects of interest using the three-dimensional neural network. At block 630, a disease state grade is predicted for each pixel or voxel within the medical images using the three-dimensional neural network. At block 635, the voxelwise risk map of the object of interest occupancy determined based on the estimated segmentation boundary around the one or more objects of interest and the disease state grade for each pixel or voxel within the medical images is output from the three-dimensional neural network. In some instances, the voxelwise risk map is provided. For example, the voxelwise risk map may be stored in a storage device and/or displayed on a user device.

At optional block 640, action is taken based on the voxelwise risk map. In some instances, the action includes determining a size, surface area, and/or volume of the one or more objects of interest based on the estimated segmentation boundaries around the one or more objects of interest. In some instances, (i) the voxelwise cancer risk map, and/or (ii) a size, surface area, and/or volume of the one or more objects of interest, is provided. For example, (i) the voxelwise cancer risk map, and/or (ii) a size, surface area, and/or volume of the one or more objects of interest, may be stored in a storage device and/or displayed on a user device. A user may receive or obtain (i) the voxelwise cancer risk map, and/or (ii) a size, surface area, and/or volume of the one or more objects of interest.

In some instances, the action includes determining a diagnosis of the subject using: (i) the voxelwise cancer risk map, and/or (ii) a size, surface area, and/or volume of the one or more objects of interest. In some instances, the action includes administering, by a user, a treatment with a compound (e.g., to the subject) based on (i) the voxelwise cancer risk map, (ii) a size, surface area, and/or volume of the one or more objects of interest, and/or (iii) the diagnosis of the subject. In other instances, the action includes determining a treatment plan based on (i) the voxelwise cancer risk map, (ii) a size, surface area, and/or volume of the one or more objects of interest, and/or (iii) the diagnosis of the subject, such that a dosage for a drug may be calculated based on the size, surface area, and/or volume of the one or more objects of interest. In some instances, the action includes determining if a treatment is effective or if a dosage for a drug needs to be adjusted based on a comparison of the a size, surface area, and/or volume corresponding to the one or more objects of interest for a first time point to a size, surface area, and/or volume corresponding to the one or more objects of interest for a second time point. In some instances, the action includes obtaining the object of interest occupancy and disease state grade for specific regions of interest of the object of interest (e.g., zoom in and get classification for specific region drawn on MRI of the prostate gland) using histograms or differentiable approximations thereof derived from the object of interest occupancy and disease state grade.

IV. Examples

The systems and methods implemented in various embodiments may be better understood by referring to the following examples.

Study 1. —Mixed Strong-Weak Supervision for Improved 3D Prostate Cancer Detection from MRI An approach for enhancing prostate cancer grading using as groundtruth a combination of strong lesion-biopsy scores and weak sextant-biopsy scores.

Dataset and Problem Formulation

The cohort used in this example is comprised of 973 multiparametric prostate MRI exams from 921 subjects that subsequently underwent MRI/US fusion prostate biopsy of 1440 radiologist-identified MRI targets as well as biopsy of systematic biopsy sites before April 2019. Exclusion criteria included prior treatment, imaging artifacts, incomplete acquisition or no systemic biopsy results. The data was split to 768 cases for training/validation and 195 cases for testing. 608 (62.5%) of exams had a single MRI target lesion, 274 (28.2%) had 2 lesions, 78 (8.0%) had 3 lesions and 13 (1.3%) had 4 lesions. All 1440 MRI lesions targeted for biopsy were annotated on all relevant slices with bounding boxes on axial T2WI by an abdominal imaging radiology fellow in MD.ai. Bounding box coordinates were converted to 3D masks.

Data were extracted from both pathology and radiology reports. Biopsy pathology reports were split into individual results. Any result containing "MRI" was identified and Gleason score extracted by isolating numbers preceding and following a "+" character, which was converted to Gleason grade. Similarly, any result starting with text corresponding to a systematic/sextant biopsy site (left/right apex/mid/base/anterior) was identified, Gleason score extracted and converted to Gleason grade. Mid and anterior grade results were combined with maximum grade. The numbering of MR lesions was confirmed to match between pathology reports and radiology reports by radiologist review. A summary of pathology results is shown in Tables 1 and 2, including a breakdown of lesion PIRADS scores and groundtruth biopsy score percentages for the train and test groups.

of cases were manually corrected by an abdominal imaging radiology fellow. Whole gland segmentations were processed into sextant segmentations using geometric techniques as follows. A sagittal maximum intensity projection of the whole gland was isotropically resampled and fit with an ellipse. The major axis of the ellipse was divided equally to determine the boundaries between the apex, mid and base of the prostate gland. The boundary of the right and left prostate gland were identified by finding the mean of the rightmost and leftmost extent of the prostate gland. These boundaries were broadcast into 3D and resampled to the original image resolution. All sextant segmentations were manually reviewed by a radiologist and no failures were identified.

ADC and DWI were registered to T2WI using subject coordinates using the Advanced Normalization Tools registration module. The registration was manually reviewed. T2WI, ADC and DWI pixel values were normalized separately for each exam and series by rescaling pixel intensities within the segmented prostate gland from 0.5% to 99.5%. All exams in the cohort were resampled to the minimum pixel spacing in X, Y, and Z present in the cohort.

Figure 7:
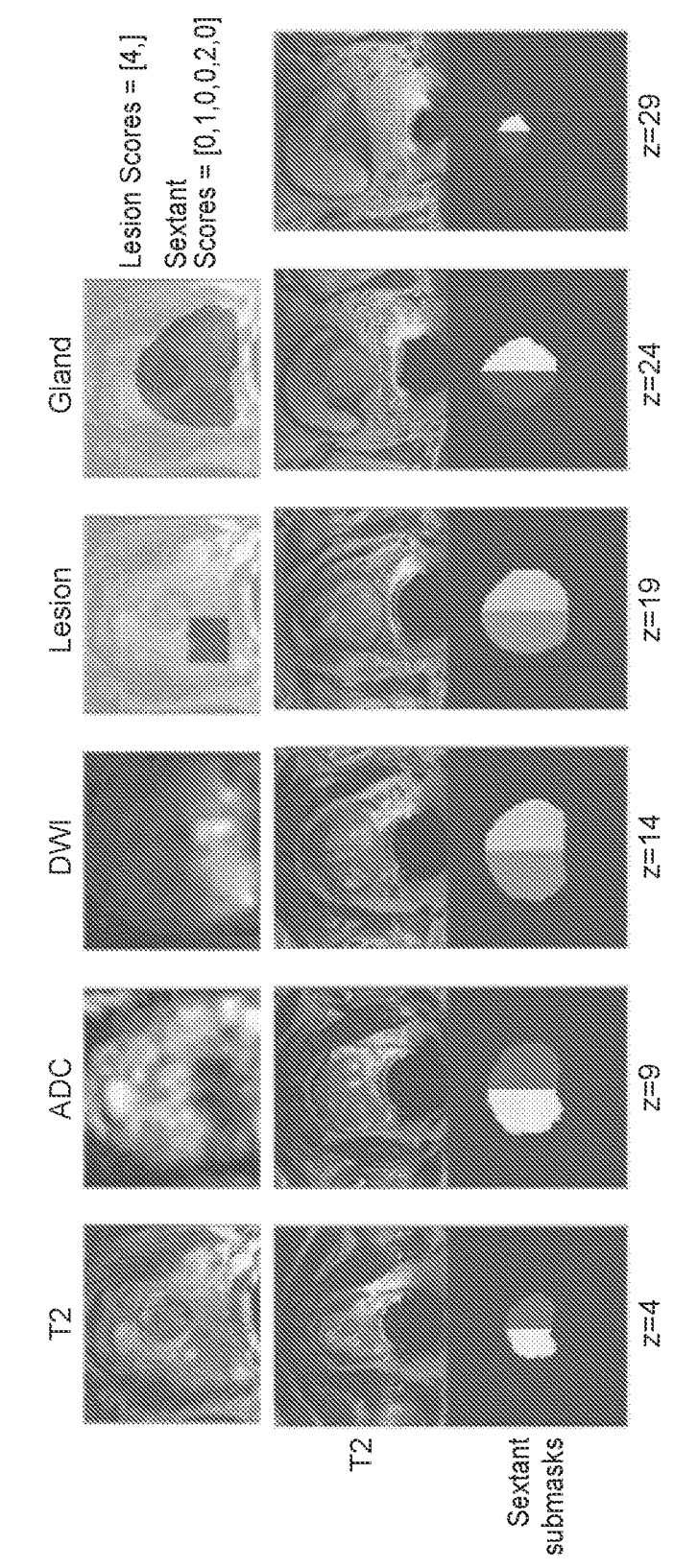
FIG. 7 shows various inputs and groundtruth specification at various slices of a subject exam in accordance with various embodiments.

The goal of the study was to improve the detection of CS-PCa from prostate MRI with both location and grading information compared to the clinical standard of PIRADS. Initially, lesion locations provided as volumetric masks and multi-level lesion Gleason grade values were used to strongly supervise a network. These results were evaluated on a lesion-wise and gland-wise basis. Next, sextant locations in the form of volumetric masks and multi-level sextant Gleason grade values were added to add weak supervision to the network using both strong and weakly supervised inputs to improve the detection of CS-PCa on a gland-wise basis. FIG. 7 shows the various inputs and groundtruth specification at various slices of the subject exam. This improvement in CS-PCa detection has the poten-

TABLE 1

| Train distribution of groundtruths over 778 exams: | | | | | | |
|---|---|---|---|---|---|---|
| | Gleason Grade | | | | | |
| | 0 (benign) | 1 | 2 | 3 | 4 | 5 |
| Lesion | 569 (49.4%) | 280 (24.3%) | 202 (17.6%) | 57 (5.0%) | 20 (1.7%) | 22 (1.9%) |
| Sextant | 2898 (62.1%) | 1137 (24.4%) | 405 (8.7%) | 137 (3.1%) | 43 (0.9%) | 48 (1.0%) |
| Gland lesion maximum | 309 (39.1%) | 195 (25.0%) | 183 (23.5%) | 52 (6.7%) | 20 (2.6%) | 19 (2.4%) |
| Glad overall maximum | 110 (14.1%) | 247 (31.7%) | 263 (33.8%) | 95 (12.2%) | 31 (4.0%) | 32 (4.1%) |

50

TABLE 2

| Test distribution of groundtruths over 195 exams: | | | | | | |
|---|---|---|---|---|---|---|
| | Gleason Grade | | | | | |
| | 0 (benign) | 1 | 2 | 3 | 4 | 5 |
| Lesion | 137 (47.2%) | 85 (29.3%) | 38 (13.1%) | 21 (7.2%) | 2 (0.7%) | 5 (2.4%) |
| Sextant | 750 (62.1%) | 282 (24.1%) | 84 (7.2%) | 42 (3.6%) | 7 (0.6%) | 5 (0.4%) |
| Gland lesion maximum | 78 (40.0%) | 58 (29.7%) | 35 (17.9%) | 17 (8.7%) | 2 (1.0%) | 5 (2.6%) |
| Glad overall maximum | 23 (11.8%) | 75 (38.5%) | 55 (28.2%) | 28 (14.4%) | 7 (3.6%) | 7 (3.6%) |

Whole prostate glands were segmented on T2WI using a 3D U-Net model, as described herein with respect to Section (II). Segmentation masks were manually reviewed and 10% tial to substantially decrease the rate of unnecessary prostate biopsies in subjects with suspected or known prostate cancer.

Mixing Strong and Weak Objectives in 3D

Network Architecture

A fully-convolutional 3D Residual U-Net architecture with internal ReLU activation and sigmoidal output activation was implemented to produce voxel-wise maps of lesion occupancy (semantic segmentation) and cancer grade as two output channels, from registered 3-channel 3D MRI (T2w, DWI, ADC) as input (see, e.g., FIG. 3). That is, the encoded feature representation is used for related but distinct tasks of segmenting lesions and predicting cancer grade throughout the prostate, whether binary or multi-level. While clinically-significant prostate cancer detection can be posed as a semantic segmentation task similar to lesion detection, it was chosen instead to pose this as a regression task due to the unique problem considered in this disclosure of incorporating both strong and weak cancer labels in 3D.

Strongly Supervised Loss for Regression in Lesions

Lesions are typically both well-localized by radiologists and generally homogeneous with respect to abnormal cell prevalence, making them excellent candidates for voxelwise strong supervision to a known target value, whether a binary indication of cancer grade or a multi-level ISUP score. Thus, without many caveats a p-norm can be used to compare predicted cancer grade to the measured biopsy score, as follows:

$$L_p(y,\hat{y})=\|y-\hat{y}\|_p^p \qquad \text{Equation (1)}$$

where $y\in \mathbb{R}^d$ is a vector indicating the cancer grade/score of a group of d groundtruth voxels, and $\hat{y}\in \mathbb{R}^d$ are soft estimates of the those grades (we will use this notation henceforth). At a cellular level, it is expected all voxels corresponding to a lesion to have the same biopsy value (unimodal distribution).

Weakly Supervised Loss for Regression in Sextants

In contrast to lesions, regression on systematic sextant biopsy scores is far less straightforward, primarily because the biopsy location is not recorded for these measurements and the underlying tissue composition is typically heterogeneous, exhibiting cancer in only a subset of cells. Given the relatively large volume corresponding to a sextant, this poses a challenge when deciding which voxels to penalize, and what target values they should take. In this disclosure, it is assumed that the sampled sextant biopsy score is representative of the maximum cancer grade in a sextant, while the exact distribution will remain unknown. Note here that penalization of the maximum of a group of voxels max(x) is considered a differentiable function for deep learning, when the maximum value of the vector x is selected for regression at run-time. However, as this only penalizes a single voxel of the millions present in a prostate MRI exam, it is ultimately an extremely weak form of supervision.

Notably, there are several smooth approximations of max suitable for regression, which expand the number of voxels affected in a single update step. For instance, softmax $e^{\alpha x_i}/\Sigma_{j=1}^{d}e^{\alpha x_j}$ is atypical choice for approximating peak prominence continuously as a function of all observed voxels, although this is typically only used for mutually-exclusive outputs. As it is unknown which voxel should be penalized, using max of softmax is not conformal with the groundtruth in this setting. Another choice is again the p-norm $\|x\|_p=(|x_1|^p+\ldots+|x_d|^p)^{1/p}$, which converges to max as p→∞ but this may prove difficult to reliably tune for finite p and arbitrary d due to averaging.

To provide a simpler smooth estimate of max of $x\in \mathbb{R}^d$ (with d varying from $10^0$ to $10^4$), a new smooth maximum can be defined, denoted mãx, using first and second order moments:

$$m\tilde{a}x(x)=w_{scale}(\mu_x+K_{high}*\sigma_x) \qquad \text{Equation (2)}$$

where $K_{high}=3$ was picked arbitrarily in this study for simplicity, given the expected bimodal distribution representing healthy and abnormal cells in the prostate gland. This expression has the advantage of being easy to interpret and compute, and has the potential for accurately capturing extremal values, but has the downside of potentially shifting the mean of the entire distribution and overestimating the maximum. This can be an issue when trying to match the "maximum" taken by a group of voxels to a specific target value, e.g., using 2-norm or similar. Note, by Popoviciu's inequality the maximum variance of a random variable bounded on [0, 1] is ¼, so a strong mean-shift scenario can be mitigated (but not eliminated) by picking $w_{scale}(x)=2x/3$ (for K=3), though this is a heuristic.

To this end, the loss $L_{bimodal}$ may be defined as the linear combination of the smooth max (mãx) error, and a penalty term encouraging the absolute max be strictly less than the groundtruth maximum.

$$L_{m\tilde{a}x}(y,\hat{y})=\lambda_{penalty}\|ReLU(max(\hat{y})-max(y))\|_1+\lambda_{penalty}\| \\ (max(\hat{y})-max(y))\|_1 \qquad \text{Equation (3)}$$

In particular, in the study $\lambda_{m\tilde{a}x}=0.9$, $\lambda_{penalty}=0.3$ was set, since it was found this strongly discourages over predictions of the background when the groundtruth is 0, while reporting a loss value that is representative of a worst-case mean absolute error. Note here, 1-norm can be substituted with a more suitable weighted p-norm, better matched to the range of the expected distribution of y and ŷ.

Supervision Via Regional Histograms

Figure 8:
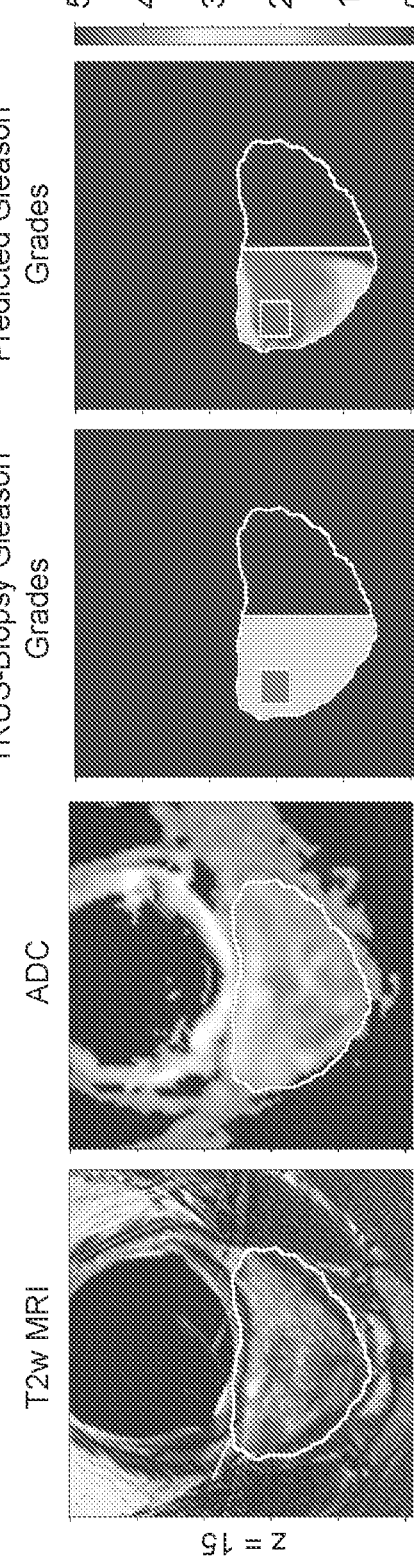
FIG. 8 shows various MRI images and corresponding TRUS-biopsy Gleason grades and 3D Gleason Grade predictions in accordance with various embodiments.

In order for the weak supervision to work optimally, the supervision may be applied not only at the output of the classification layer, but also spatially to the 3D Gleason grade map that is produced. This can be done using a histogram representation of the Gleason grade in each specified region of interest. FIG. 8 illustrates an example, where this matters, where the targeted lesion biopsy indicates no clinically significant prostate cancer (Gleason Grade 1) but the sextant biopsy revealed Gleason Grade 2.

Figure 9:
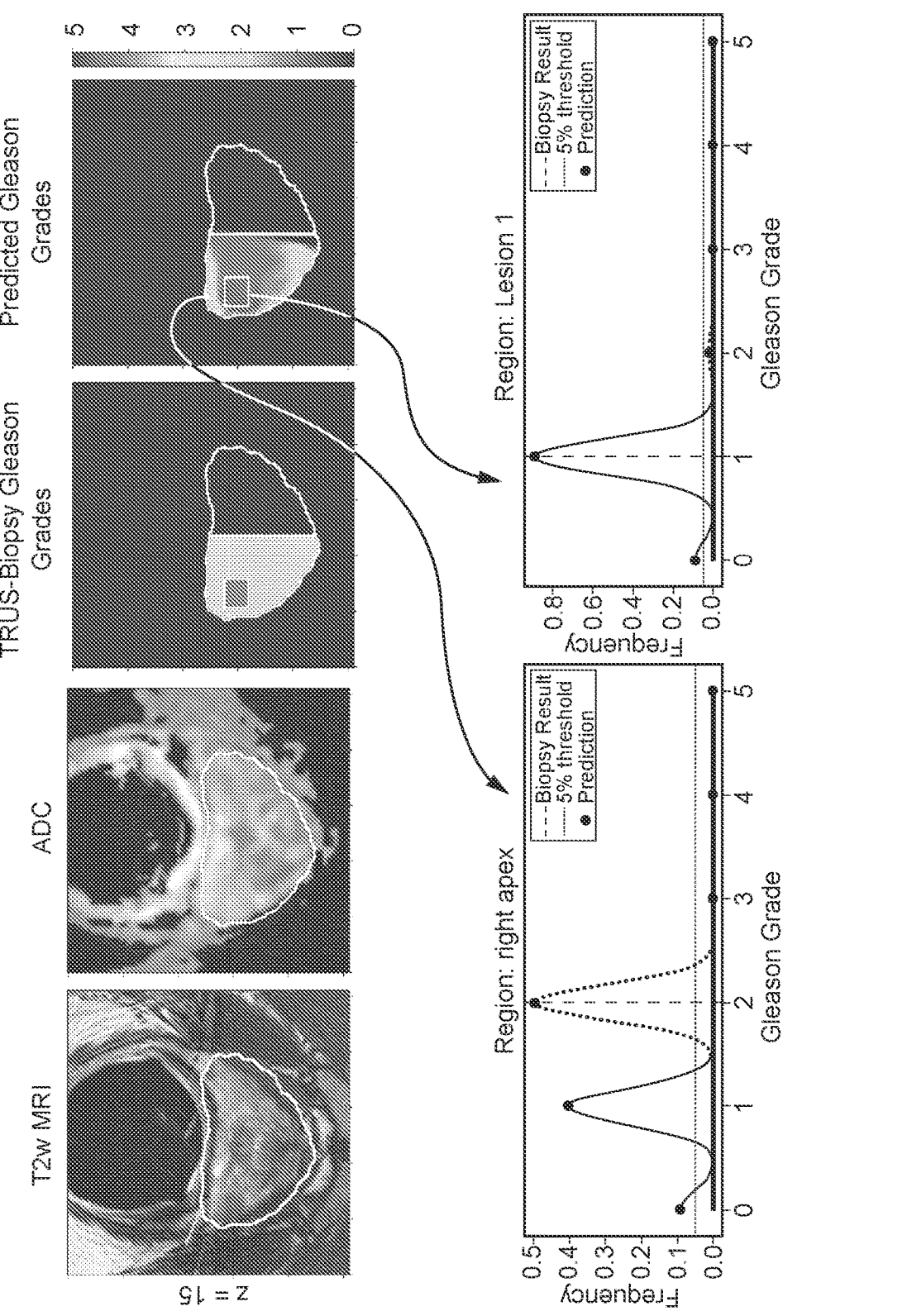
FIG. 9 shows computing a fully-differentiable approximation of the histogram of the 3D Gleason Grade prediction in accordance with various embodiments.

In order to generate this spatial map (FIG. 8 is showing a single slice of a 3D volume), a regression is performed not only by value, but also by distribution. Specifically, for a given region a set of radial basis functions parameterized by a set $\{\mu_i, \sigma_i\}$ is used to compute a fully-differentiable approximation of the histogram of the 3D Gleason Grade prediction (as illustrated in FIG. 9) (Equation 4).

$$h_i = \sum_{k\in R}N(\hat{y}[k] - \mu_i, \sigma_i) \qquad \text{Equation (4)}$$

This histogram is used in two ways. First, supervision may be applied on the histogram values themselves (as illustrated in FIG. 9), e.g. when the pathology report indicates a certain percentage or proportion of a cells with a particular Gleason Grade (e.g. bin corresponding to Gleason Grade 3 should be 50%). Supervision may also be applied on the relative frequency of histogram values. For example, for lesions, the true pathology distribution is assumed to be unimodal around the groundtruth Gleason grade, i.e. a "peak", so the proportion of voxels predicted with both lower and higher grades should be minimized. Whereas for sextants, the systematic biopsies are assumed to be representative of only the maximum Gleason Grade in each pathologically-diverse region, so supervision is applied by suppressing the proportion of all grades/bins higher than the groundtruth grade. In both cases, this form of weak supervision (Equation 5) works to anchor the spatial distribution of the predicted 3D Gleason Grade volume to appropriate magnitude values. Additionally, for lesions, it is possible go further than regressing on the expectation or density, and a loss can be added on the actual pixel values and locations themselves, since the lesions are assumed to be unimodal (Equation 6).

$$L_{weak} = \begin{cases} \sum_i h[i \neq g] & \text{if in lesion} \\ \sum_i h[i > g] & \text{if in sextant} \end{cases}$$ 
Equation (5)

$$L_{strong} = \sum_{k \in R} |\hat{y}[k] - g| \text{ for lesions}$$ 
Equation (6)

Figure 10:
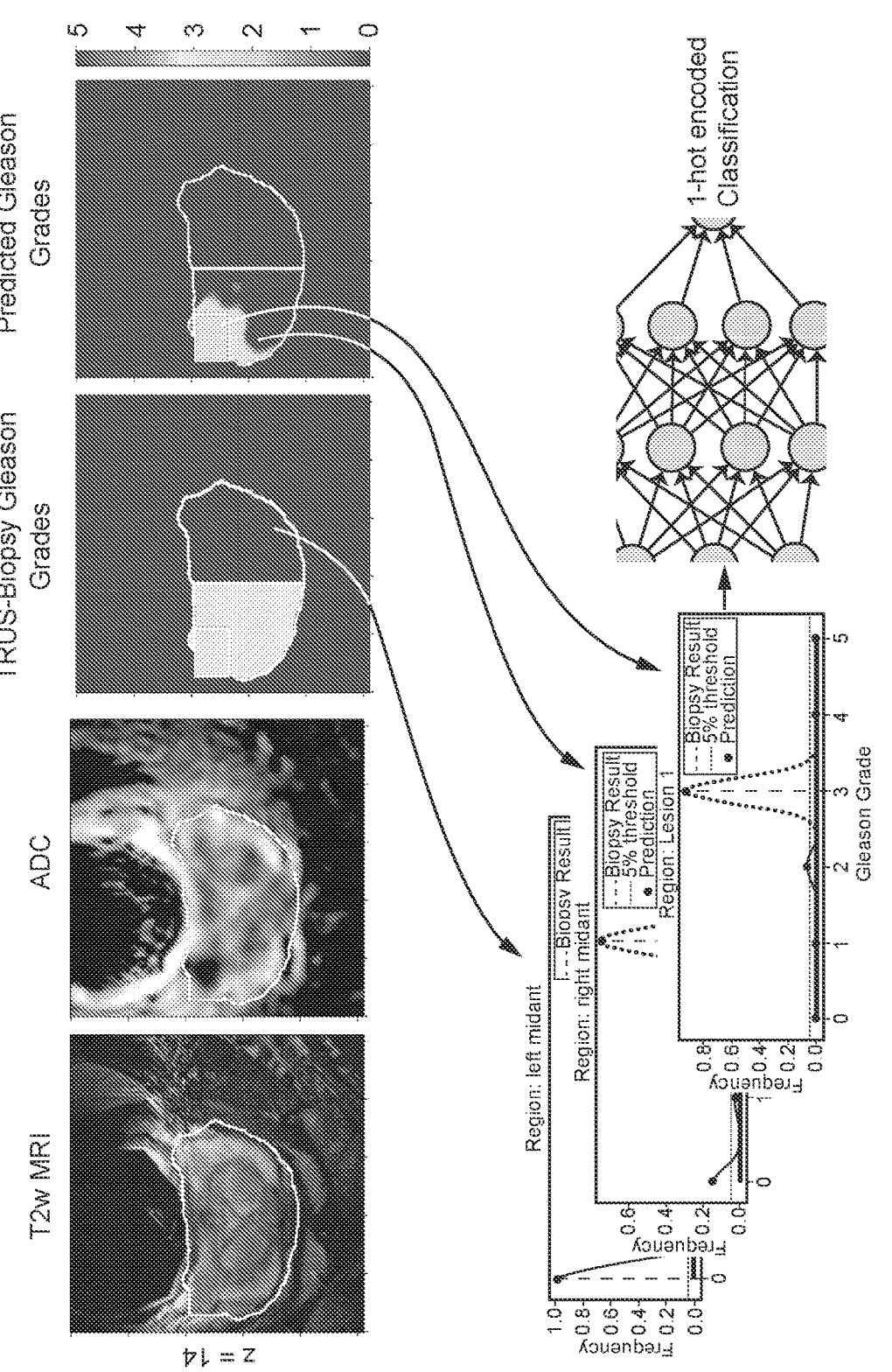
FIG. 10 shows applying a shallow, fully-connected (dense) neural net to perform a final, definitive classification in accordance with various embodiments.

Second, the histogram may be feed into a another neural network module (e.g. shallow neural net, fully-connected (dense) neural net, or deep neural net) to perform the final, definitive classification of cancer in a region (Equation 7) into a one-hot encoded vector or scalar prediction value for each region of interest (as illustrated in FIG. 10). Thus, the soft-histogram is a way to perform dimensionality reduction on arbitrary-sized regions to get a consistently-sized vector for each region, on which classification can be performed. Although FIG. 10 depicts a typical neural network, it should be understood that for the above-described histogram application the final classification layers can be very shallow (e.g., 2 layers, and a total of 93 parameters for the classification layers). The final classification prediction can then be optimized with respect to a groundtruth Gleason Grade $z$ using any loss function suitable for binary or multi-class classification, such as Binary Cross-entropy (BCE) (Equation 8).

$$\hat{z} = DNN(h)$$ 
Equation (7)

$$L_{grading} = BCE(z, \hat{z})$$ 
Equation (8)

Figure 11:
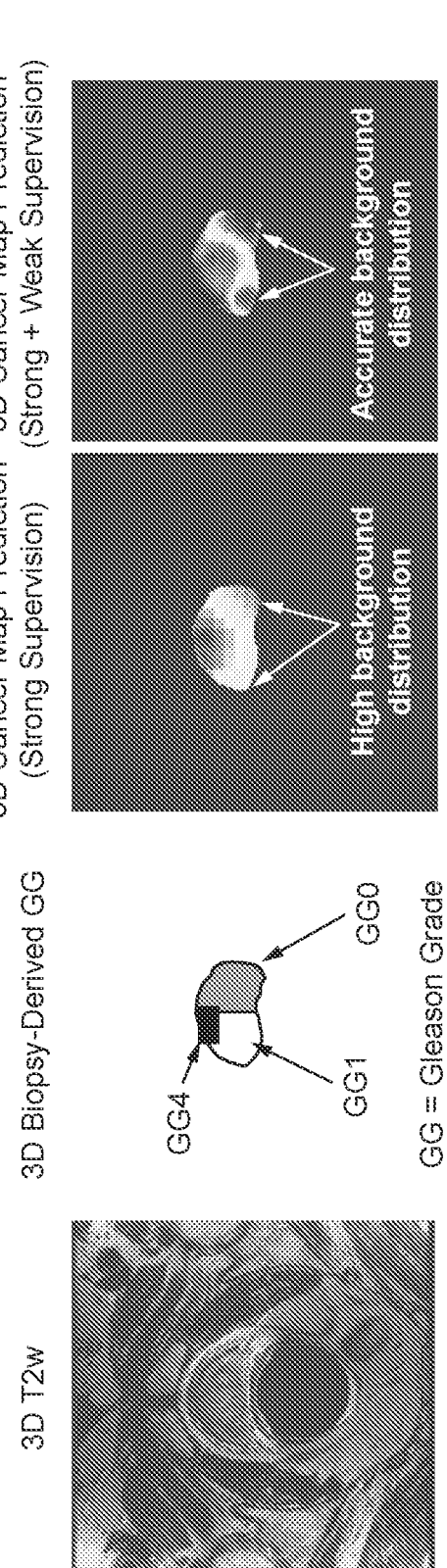
FIG. 11 shows components of a multi-task loss function in accordance with various embodiments.

Consequently, for a given exam, there are a number of possibilities of objective functions, which can be achieved by adjusting the coefficient vector $\{\lambda_i\}$. As shown in FIG. 11, the multi-task objective or loss function (Equation 9) may include (i) the soft-histogram-based suppression of higher Gleason Grades in each sextant and lower/higher Gleason grades in each lesion, denoted as $L_{weak \ (histogram)}$, (ii) voxel-wise mean absolute error or mean-square error in lesions, denoted as $L_{strong \ (voxelwise)}$, (iii) region-wise or exam-wise Gleason grade classification loss, denoted as $L_{grading \ (regionwise)}$, and (iv) a DICE loss for prediction of the lesion segmentation mask $L_{segmentation \ (lesions)}$ (by adding this loss there can be an improvement in overall accuracy of the system, since it's a related task). Advantageously, using this two-stage approach it is possible to keep the benefits of a fully-convolutional model and a classification model. In particular, it has been found that combining both types of biopsy data reduces background signal of cancer prediction.

$$L = \lambda_1 L_{weak \ (histogram)} + \lambda_2 L_{strong \ (voxelwise)} + \lambda_3 L_{grading \ (regionwise)} + \lambda_4 L_{segmentation \ (lesions)}$$ 
Equation (9)

Balanced Multi-Task Objective

Providing supervision for a larger number of voxels invariably improves performance. However, another way to improve performance is to constrain the feature extraction and decoding branch by additionally regressing on a related task. For this instance, it was chosen to regress on annotated lesion segmentations, with the expectation that the network can learn to disentangle differences between cancer manifestations in lesions and prostate tissue by concurrently learning to recognize the semantic regions themselves. A coupled issue in this vein is correcting for the observable imbalance between different cancer severity groups (GS 1-5) that occur in these different regions, with the ambition of being able to classify each subgroup equally well. To this end, the loss computed over each group (0-5, with 0 indicating no cancer) was averaged, discluding empty groups at runtime when training.

Thus, combining the strongly supervised loss that compares prostate cancer detections at every voxel (Equation 1), with weakly supervised loss that approximates and penalizes the max peak of a region (Equation 3), averaging these over every region and observed grade group, and adding an additional semantic segmentation (DICE) loss, yields the multi-task objective (Equation 10):

$$L(y, \hat{y}) = \lambda_{strong} \left( \sum_{g=0}^{5} \frac{1}{L} \sum_{l=1}^{L} L_2(\hat{y}_1[I_{lg}], y_1[I_{lg}]) \right) +$$
$$\lambda_{weak} \left( \sum_{g=0}^{5} \frac{1}{6} \sum_{s=1}^{6} L_{m\hat{a}x}(\hat{y}_1[I_{sg}], y_1[I_{sg}]) \right) +$$
$$\lambda_{segmentation} \left( \frac{\sum \hat{y}_0 \cdot y_0}{\sum \hat{y}_0 + y_0} \right)$$

Equation (10)

where $(y_0, y_1)$ denote the two channels of 3D groundtruth (lesion segmentation mask and cancer severity, respectively), $(\hat{y}_0, y_0)$ conformally denote the two channels of soft (sigmoid-activated) predictions, I, denotes a Kronecker delta index selecting voxels of group * with 3D spatial coordinates (abusing notation to write $(I_{a,b}=I_a \cdot I_b)$, the index g runs over ISUP grade groups (0-5), the index l runs over the number of lesions L observed, and the index s runs over the six prostate sextants. A 3D fully convolutional network was used to directly predict cancer grade at each voxel (with non-lesion voxels allowed to take values >0) without region proposals. So, the lesion segmentation output is auxiliary and does not gate classification decisions; it is used here as another guiding supervision signal, with the intention that it will improve convergence and robustness.

Results and Discussion

Experiments

To quantify the improvements due to the addition of different training signals, networks were trained on different parametrizations of $\bar{\lambda}=(\lambda strong, \lambda weak, \lambda segmentation)$ in the balanced objective (Equation 10). In particular, three cases were considered in this initial study: (1) $\bar{\lambda}=(1.0, 0.0, 1.0)$ with lesion grading and segmentation, (2) $\bar{\lambda}=(1.0, 0.5, 0.0)$ with lesion and sextant grading, and (3) $\bar{\lambda}=(1.0, 0.5, 1.0)$ with lesion grading and segmentation and sextant grading. Each version of the network was trained for 35 epochs using a standard Adam optimizer with initial learning rate of 10-4 without weight decay, and balanced batches of 120 [64, 64, 16] mm sub-volumes of 3D mpMRI sampled from each Gleason score group, until the lesion grade prediction accuracy on the training set reached approximately 95%, as to prevent overfitting. While more extensive tests may be desirable for establishing optimal balancing of these hyper-parameters, convergence rate of these 3D networks was slow, taking on order of days to yield a meaningful result, perhaps due to both the amount of data being processed by the network and also the difficulty of the grading task itself given the weak/noisy labels.

Using the 3D outputs generated by the model, predictions were generated to answer three questions:

1. Does this radiologist-identified lesion have clinically-significant prostate cancer (CS-PCa)?
2. Based on all radiologist-identified lesions in a mpMRI exam, does this subject have CS-PCa?
3. Based on all mpMRI exam data (i.e. including sextant voxels), does this subject have CS-PCa?.

3D Inference and Detection Criteria

Figure 12:
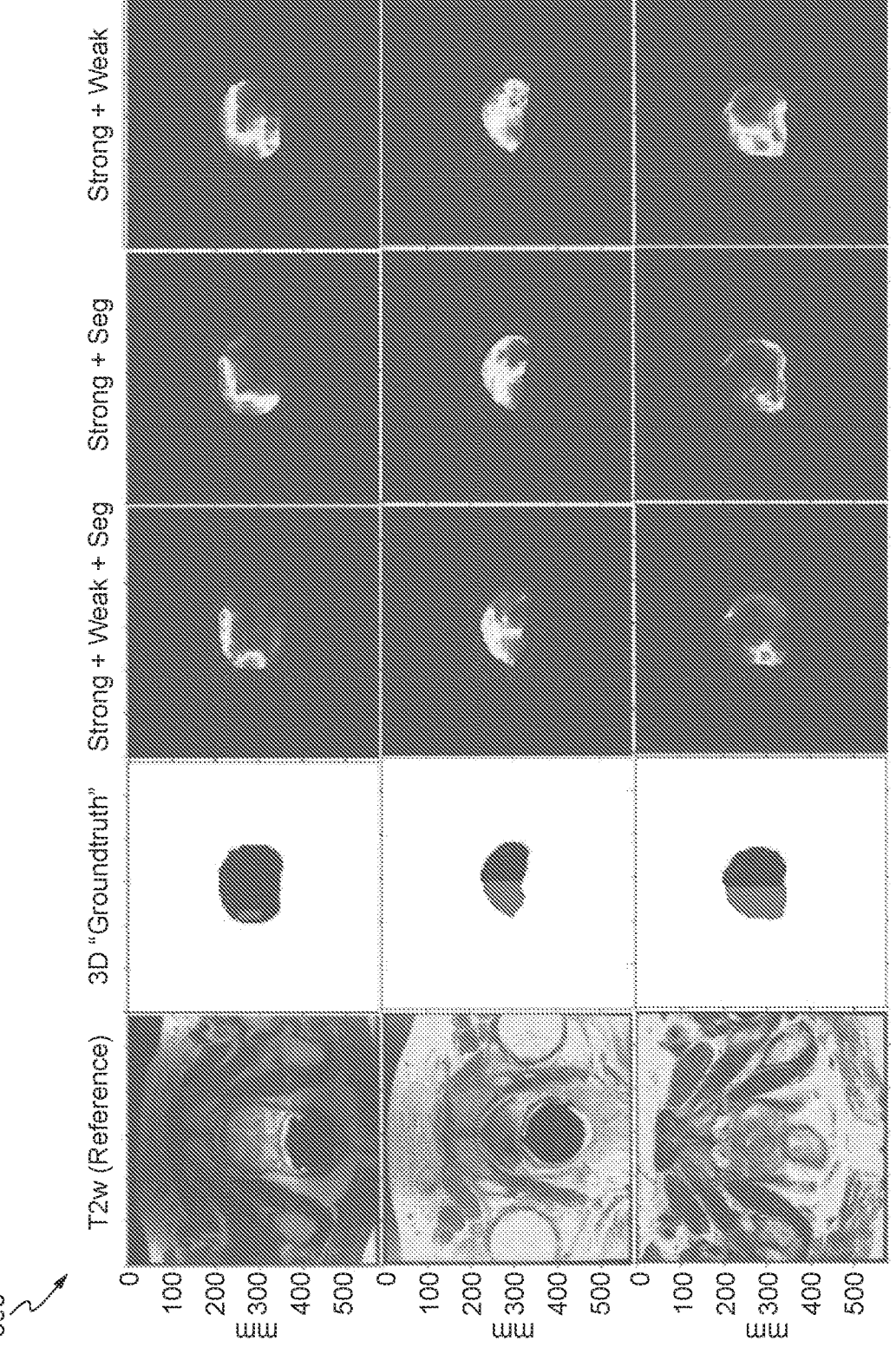
FIG. 12 shows a comparison of cancer grade predictions for slices across several 3D mpMRI exams, with T2 shown for reference in accordance with various embodiments.

Noting that using a fully-convolutional 3D architecture, it is possible but infeasible to feed the entire input volume to the network at once. Instead, [128,128,16] mm sub-volumes cancer in lesions, sextants, and overall for each exam. Note that prostate cancer prediction from MRI is an extremely challenging task, even for trained radiologists (evident in performance of PIRADSv2). Surprisingly, the network trained with only strong supervision does a non-trivial job in grading some sextants, indicating some level of generalization in detecting cancerous manifestations in lesion and gland tissue. This is additionally evident in the visualizations of 3D predicted volumes (see, e.g., FIG. 12). However, notably, without the segmentation training signal the accuracy of lesion and sextant grading is considerably lower. Compared to PIRADSv2, the improvements due to mixed strong-weak supervision were the most dramatic, although in range with the values of related (but distinct) cancer grading tasks focused on lesions alone. Note that area-under-the-curve (AUC) is the common metric reported in the literature, as detectability of cancer from MRI is not well established, unlike for typical machine learning problems that are focused on natural (RGB) imagery.

TABLE 3

Comparison of Accuracy (Acc.) and AUC of the reciever-operator-characteristic (ROC) measured on a shuffled test set of 195 exams. Accuracy is measured by picking a nominal threshold from validation data, whereas AUC is generated by sweeping a range of thresholds.

| Task | Lesions | | Sextants | | Exam (Lesions) | | Exam (overall) | |
|---|---|---|---|---|---|---|---|---|
| Method | Acc. | AUG | Acc. | AUG | Acc. | AUG | Acc. | AUG |
| PIRADSv2 | — | 0.72 | — | — | — | — | — | — |
| Strong + Seg. | .631 | .693 | .534 | .554 | .588 | .646 | .574 | .617 |
| Strong + Weak | .639 | .725 | .516 | .557 | .599 | .616 | .479 | .512 |
| Strong + Weak + Seg. | .708 | .738 | .600 | .621 | .665 | .712 | .617 | .649 | of the full volume (sampled with stride-length of [32,32,8]) were fed into the network, and a full 3D volume was assembled at the same resolution as each subject exam. That is, each voxel of the output was averaged over multiple feed-forward passes of the network, as to ensure consistency and smoothness at the voxel scale.

In lieu of using a 3D object detection architecture, such as an adaptation of Mask-RCNN or similar which requires bounding-box prediction, decisions were made through a semi-supervised query process. Here, cancer grading in lesions and sextants were handled differently to accommodate the granularity of the groundtruth used for comparison. Lesion and sextant voxel coordinates were assumed as known and specified by the user, and the only question was whether a given voxel, region, or gland exhibits clinically-significant cancer. Lesions are expected to be homogeneous, and can therefore be detected by thresholding (optimal) and averaging. Sextants, on the other hand, are highly inhomogeneous, so summarization via a mean can prove ineffective e.g. bimodal distributions.

These detection mechanisms were addressed jointly by computing histograms of each query region. FIG. 4 shows example histograms from different predicted sextant and lesion query regions. In this representation, cancers in lesions were detected by computing and rounding the average (soft) voxelwise prediction using estimated histogram densities. Cancers in sextants were instead detected by peak-finding and thresholding histograms by peak prominence and count.

Table 3 highlights the differences in performance between different modes of supervision. Results show that the introduction of weak supervision and the lesion segmentation training signal improves the overall prediction of prostate

DISCUSSION

Prostate cancer is the second most frequent malignancy (after lung cancer) in men worldwide. Given the morbidity of associated treatments (radical prostatectomy and radiation therapy), and in an effort to reduce overtreatment of indolent disease, it is imperative to determine which men require definitive therapy and which can simply be monitored. This is an open medical challenge. In this study, deep learning was used to help guide the interpretation and detection of cancers non-invasively. While doctors are not relying solely on machine learning to identify prostate cancer, failures in this system can lead to adverse consequences and even death in subjects with aggressive cancer. Compared with benchmark machine learning datasets focused on the natural image domain or even on X-ray CT, processing of 3D prostate MRI data is challenging both computationally and due to contrast; MRI features of prostate cancer are more subtle and likely better learned from the groundtruth entirely, although this is specified very scarcely. The availability of groundtruth labels is a fundamental bottleneck here, as only subjects suffering from severe cancer are typically recommended for surgery or radiation with associate morbidity (incontinence and impotence), whereas early detection of CS-PCa (Gleason Grade 2, Gleason Score 3+3) is more challenging, and largely not addressed by the literature. Thus the task of including as much data as possible is imperative to increasing the granularity and specificity of detections at an early stage of cancer. Even though a large dataset of 921 subjects was included in this study, it was found this is still not nearly enough data alone. Instead, the inclusion of all available supervision signals, whether strong or weak, as considered in this disclosure (mixed strong and weak supervision terms in the objective function), is important to increasing the granularity and specificity of detections at an early stage of cancer. Using a smooth continuous approximation of the max function on the interval [0, 1], it has been shown that weak sextant biopsy scores can be effectively regressed on in order to improve the overall performance (AUC) of clinically-significant prostate cancer (CS-PCa) detection by as much as 5%. From the experiments, it can be deduced that in addition to improving accurate prediction in the non-lesion gland tissue (sextants), the introduction of weak-supervision improves detection of prostate cancer at both the lesion and exam level. Moreover, combining sextant and lesion detection scores further improves the detection of cancer at the exam level.

Additional Considerations

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more algorithm specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method for cancer detection, comprising:
obtaining medical images of a subject, the medical images include an object of interest;
inputting the medical images into a three-dimensional neural network model constructed to produce a voxelwise risk map of an object of interest occupancy and disease state grade as two output channels using an objective function comprising a first loss function and a second loss function, wherein the first loss function captures supervised loss for regression in the object of interest based on groundtruth lesion-biopsy scores and the second loss function captures supervised loss for regression in regions of the object of interest based on groundtruth region-biopsy scores;
generating, using the three-dimensional neural network model, an estimated segmentation boundary around the object of interest;
predicting, using the three-dimensional neural network model, a disease state grade for each pixel or voxel within the medical images; and
outputting, using the three-dimensional neural network, the voxelwise risk map of the object of interest occupancy determined based on the estimated segmentation boundary around the object of interest and the disease state grade for each pixel or voxel within the medical images.

2. The method of claim 1, wherein the object of interest is a lesion.

3. The method of claim 1, wherein the medical images are obtained using magnetic resonance imaging.

4. The method of claim 1, further comprising, prior to inputting the medical images into a three-dimensional neural network model:

inputting the medical images into a segmentation model constructed to segment a region of interest;

generating, using the segmentation model, an estimated segmentation boundary around the region of interest;

outputting, using the segmentation model, the medical images with the estimated segmentation boundary around the region of interest; and cropping the medical images based on the estimated segmentation boundary to generate portions of the medical images comprising the region of interest, wherein the portions of the medical images comprising the region of interest are input into the three-dimensional neural network model for producing the voxelwise risk map of the object of interest occupancy and the disease state grade as the two output channels.

5. The method of claim 4, wherein the region of interest is the prostate gland.

6. The method of claim 1, wherein:

the three-dimensional neural network model comprises a plurality of model parameters identified using a set of training data comprising a plurality of medical images with annotations associated with: (i) segmentation boundaries around objects of interest and systematic or region biopsy with disease state grades; and the plurality of model parameters are identified using the set of training data based on minimizing the objective function.

7. The method of claim 6, wherein the objective function further comprises a Dice loss function, and the objective function averages the supervised loss for regression in the object of interest and the supervised loss for regression in the regions of the object of interest over each region and observed grade group.

8. The method of claim 1, further comprising:

determining a size, surface area, and/or volume of the one or more lesions based on the estimated segmentation boundary; and providing: (i) the voxelwise cancer risk map, and/or (ii) a size, surface area, and/or volume of the object of interest.

9. The method of claim 8, further comprising: determining, by a user, a diagnosis of the subject based on (i) the voxelwise cancer risk map, and/or (ii) the size, surface area, and/or volume of the object of interest.

10. The method of claim 9, further comprising administering, by the user, a treatment with a compound based on (i) the voxelwise cancer risk map, (ii) the size, surface area, and/or volume of the object of interest, and/or (iii) the diagnosis of the subject.

11. A system comprising:

one or more data processors of a local cloud server; and a non-transitory computer readable storage medium containing instructions which, when executed on the one or more data processors, cause the one or more data processors to perform actions including:

obtaining medical images of a subject, the medical images include an object of interest;

inputting the medical images into a three-dimensional neural network model constructed to produce a voxelwise risk map of an object of interest occupancy and disease state grade as two output channels using an objective function comprising a first loss function and a second loss function, wherein the first loss function captures supervised loss for regression in the object of interest based on groundtruth lesion-biopsy scores and the second loss function captures supervised loss for regression in regions of the object of interest based on groundtruth region-biopsy scores;

generating, using the three-dimensional neural network model, an estimated segmentation boundary around the object of interest;

predicting, using the three-dimensional neural network model, a disease state grade for each pixel or voxel within the medical images; and outputting, using the three-dimensional neural network, the voxelwise risk map of the object of interest occupancy determined based on the estimated segmentation boundary around the object of interest and the disease state grade for each pixel or voxel within the medical images.

12. The system of claim 11, wherein the object of interest is a lesion.

13. The system of claim 11, wherein the medical images are obtained using magnetic resonance imaging.

14. The system of claim 11, wherein the actions further comprise, prior to inputting the medical images into a three-dimensional neural network model:

inputting the medical images into a segmentation model constructed to segment a region of interest;

generating, using the segmentation model, an estimated segmentation boundary around the region of interest;

outputting, using the segmentation model, the medical images with the estimated segmentation boundary around the region of interest; and cropping the medical images based on the estimated segmentation boundary to generate portions of the medical images comprising the region of interest, wherein the portions of the medical images comprising the region of interest are input into the three-dimensional neural network model for producing the voxelwise risk map of the object of interest occupancy and the disease state grade as the two output channels.

15. The system of claim 11, wherein:

the three-dimensional neural network model comprises a plurality of model parameters identified using a set of training data comprising a plurality of medical images with annotations associated with: (i) segmentation boundaries around objects of interest and systematic or region biopsy with disease state grades; and the plurality of model parameters are identified using the set of training data based on minimizing the objective function.

16. The system of claim 15, wherein the objective function further comprises a Dice loss function, and the objective function averages the supervised loss for regression in the object of interest and the supervised loss for regression in the regions of the object of interest over each region and observed grade group.

17. The system of claim 11, wherein the actions further comprise:

determining a size, surface area, and/or volume of the one or more lesions based on the estimated segmentation boundary; and providing: (i) the voxelwise cancer risk map, and/or (ii) a size, surface area, and/or volume of the object of interest.

18. The system of claim 17, wherein the actions further comprise:

determining, by a user, a diagnosis of the subject based on (i) the voxelwise cancer risk map, and/or (ii) the size, surface area, and/or volume of the object of interest.

19. The system of claim 18, wherein the actions further comprise facilitating administration, by the user, a treatment with a compound based on (i) the voxelwise cancer risk map, (ii) the size, surface area, and/or volume of the object of interest, and/or (iii) the diagnosis of the subject.

20. A method for cancer detection, comprising:

obtaining medical images of a subject, the medical images include an object of interest;

inputting the medical images into a three-dimensional neural network model constructed to produce a voxel-wise risk map of an object of interest occupancy and disease state grade as two output channels using an objective function comprising an object loss function and one or more histogram-based loss functions, wherein the object loss function captures supervised loss for regression in the object of interest based on groundtruth lesion-biopsy scores and the histogram-based second loss function captures supervised loss for regression in regions of the object of interest based on groundtruth region-biopsy scores, and wherein each loss function of the one or more histogram-based loss functions provides a differentiable measure of accuracy in predicting object of interest occupancy, disease state grade, or properties thereof in each voxel, region, and/or exam;

generating, using the three-dimensional neural network model, an estimated segmentation boundary around the object of interest;

predicting, using the three-dimensional neural network model, a disease state grade for each pixel or voxel within the medical images; and outputting, using the three-dimensional neural network, the voxelwise risk map of the object of interest occupancy determined based on the estimated segmentation boundary around the object of interest and the disease state grade for each pixel or voxel within the medical images.

* * * * *